US012658590B2

(12) United States Patent
Sakamoto et al.

(10) Patent No.: US 12,658,590 B2
(45) Date of Patent: Jun. 16, 2026

(54) ANTENNA DEVICE

(71) Applicant: Mitsubishi Electric Corporation, Tokyo (JP)

(72) Inventors: Hiroaki Sakamoto, Tokyo (JP); Hidetoshi Makimura, Tokyo (JP); Yasuhiro Nishioka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 345 days.

(21) Appl. No.: 18/234,801

(22) Filed: Aug. 16, 2023

(65) Prior Publication Data

US 2023/0395979 A1 Dec. 7, 2023

Related U.S. Application Data

(63) Continuation of application No. PCT/JP2021/014116, filed on Apr. 1, 2021.

(51) Int. Cl.

*H01Q 9/46* (2006.01)
*H01Q 1/36* (2006.01)
*H01Q 1/48* (2006.01)
*H01Q 9/16* (2006.01)

(52) U.S. Cl.

CPC ................. *H01Q 9/46* (2013.01); *H01Q 1/36* (2013.01); *H01Q 1/48* (2013.01); *H01Q 9/16* (2013.01)

(58) Field of Classification Search

CPC .. H01Q 9/46; H01Q 1/36; H01Q 1/48; H01Q 9/16; H01Q 9/26; H01Q 21/06; H01Q 9/42

See application file for complete search history.

(56) References Cited

U.S. PATENT DOCUMENTS

| | | | | |
|---|---|---|---|---|
| 6,166,684 | A | 12/2000 | Ying | |
| 6,166,694 | A * | 12/2000 | Ying | H01Q 9/0421 343/702 |
| 9,847,582 | B2 * | 12/2017 | Moulder | H01Q 21/28 |
| 2009/0121964 | A1 * | 5/2009 | Yamada | H01Q 7/00 343/866 |
| 2019/0267706 | A1 * | 8/2019 | Sampo | H01Q 9/30 |
| 2020/0274251 | A1 | 8/2020 | Sakamoto et al. | |

FOREIGN PATENT DOCUMENTS

| | | | |
|---|---|---|---|
| CN | 108281783 | A | 7/2018 |
| JP | 11-348114 | A | 12/1999 |
| WO | WO 2019/064470 | A1 | 4/2019 |

OTHER PUBLICATIONS

German Office Action for German Application No. 11 2021 006 900.4, dated Mar. 4, 2024, with English translation.

* cited by examiner

*Primary Examiner* — Minh Tran

(74) *Attorney, Agent, or Firm* — Birch, Stewart, Kolasch & Birch, LLP

(57) ABSTRACT

An antenna device includes: a feeding point that excites a high-frequency signal; a first conductor having a first end serving as a first open end and extending from the feeding point to the first open end; and a second conductor having a first end serving as a second open end and extending spirally between the feeding point and the second open end in a direction different from a direction directed from the feeding point to the first open end.

8 Claims, 11 Drawing Sheets

(a) Emission from Electric Current (b) Emission from Magnetic Current ((c) Combination of Emission from Electric Current and Emission from Magnetic Current

ANTENNA DEVICE

CROSS REFERENCE TO RELATED APPLICATION

This application is a Continuation of PCT International Application No. PCT/JP2021/014116, filed on Apr. 1, 2021, all of which is hereby expressly incorporated by reference into the present application.

TECHNICAL FIELD

The present disclosure relates to an antenna device used for, for example, a terminal or the like that receives a polarized wave transmitted from a satellite phone service or a global positioning system (GPS) satellite.

BACKGROUND ART

A terminal that receives a polarized wave transmitted from a satellite phone service or a global positioning system satellite may use a circularly polarized wave antenna in order to prevent a polarization loss from increasing even when a terminal user moves.

It is known that a circularly polarized wave antenna such as a spiral antenna increases in size when an attempt is made to widen a bandwidth of the antenna, and it is known that a back lobe which is a cross polarized wave to be emitted to an antenna rear side increases when the antenna is downsized.

An antenna device capable of suppressing reception of an unnecessary back lobe and capable of being downsized is proposed in Patent Literature 1.

In the antenna device disclosed in Patent Literature 1, a plurality of element antennas is disposed on a surface of a first ground conductor, and a portion that operates as a microstrip resonator is disposed between a second ground conductor disposed in parallel with the first ground conductor with a dielectric substrate interposed therebetween and a third ground conductor disposed in parallel with the second ground conductor.

CITATION LIST

Patent Literature

Patent Literature 1: WO 2019/064470 A

SUMMARY OF INVENTION

Technical Problem

However, further downsizing is desired in an antenna device used for a terminal or the like that receives a polarized wave transmitted from a satellite phone service or a global positioning system satellite.

The present disclosure has been made in view of the above points, and an object of the present disclosure is to obtain an antenna device in which a back lobe to be emitted to an antenna rear side is reduced without increasing an antenna size.

Solution to Problem

An antenna device according to the present disclosure includes: a feeding point that excites a high-frequency signal; a first conductor having a first end serving as a first open end and extending linearly between the feeding point and the first open end; and a second conductor having a first end serving as a second open end and extending spirally between the feeding point and the second open end in a direction different from a direction directed from the feeding point to the first open end.

Advantageous Effects of Invention

According to the present disclosure, downsizing is possible, and a back lobe to be emitted to an antenna rear side can be suppressed.

DESCRIPTION OF EMBODIMENTS

First Embodiment

An antenna device according to a first embodiment will be described with reference to FIGS. 1 to 4.

Figure 1:
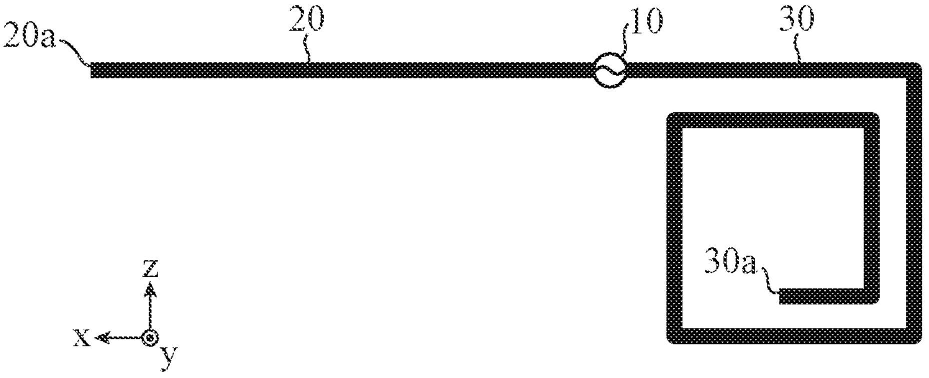
FIG. 1 is a front view illustrating an antenna device according to a first embodiment.

In FIG. 1, the z-axis is an axis indicating a zenith direction, and the x-axis and the y-axis are axes orthogonal to each other on a horizontal plane orthogonal to the zenith direction. In the present disclosure, the x-axis, the y-axis, and the z-axis all indicate the same axis.

The antenna device according to the first embodiment is a dipole antenna-shaped antenna device, and functions as a transmission antenna and a reception antenna.

The antenna device according to the first embodiment includes a feeding point a first conductor 20, and a second conductor 30.

The feeding point 10 is a portion that excites a high-frequency signal, and is a gap formed between the first conductor 20 and the second conductor 30.

In a case where the antenna device functions as a transmission antenna, a high-frequency signal is supplied to the feeding point 10, and electromagnetic waves are emitted from the first conductor 20 and the second conductor 30.

In a case where the antenna device functions as a reception antenna, electromagnetic waves are received by the first conductor 20 and the second conductor and a high-frequency signal is output from the feeding point 10.

The first conductor 20 is a conductor having a first end serving as a first open end 20*a* and extending linearly between the feeding point 10 and the first open end 20*a*. The first conductor 20 is parallel to the x-axis in FIG. 1.

The second conductor 30 is disposed on the same plane as the plane where the first conductor 20 is disposed, that is, on the x-z plane including the zenith direction.

The second conductor 30 has a first end serving as a second open end 30*a* and extends spirally between the feeding point 10 and the second open end 30*a* in a direction different from a direction directed from the feeding point 10 to the first open end 20*a*, in this example, in a direction opposite thereto. The spiral shape of the second conductor 30 is a rectangular shape.

Note that the second conductor 30 may be disposed on a plane orthogonal to the plane where the first conductor 20 is disposed, that is, the x-z plane, that is, may be disposed on the y-z plane.

An entire length from the first open end 20*a* of the first conductor 20 to the second open end 30*a* of the second conductor 30 is ½ wavelength of a wavelength corresponding to a resonance frequency. Note that the ½ wavelength does not strictly mean only the ½ wavelength, and includes a plus/minus allowable range with respect to the ½ wavelength.

In the antenna device according to the first embodiment configured as described above, when a high-frequency signal is supplied to the feeding point 10, electromagnetic waves are emitted from the first conductor 20 and the second conductor 30.

Figure 2:
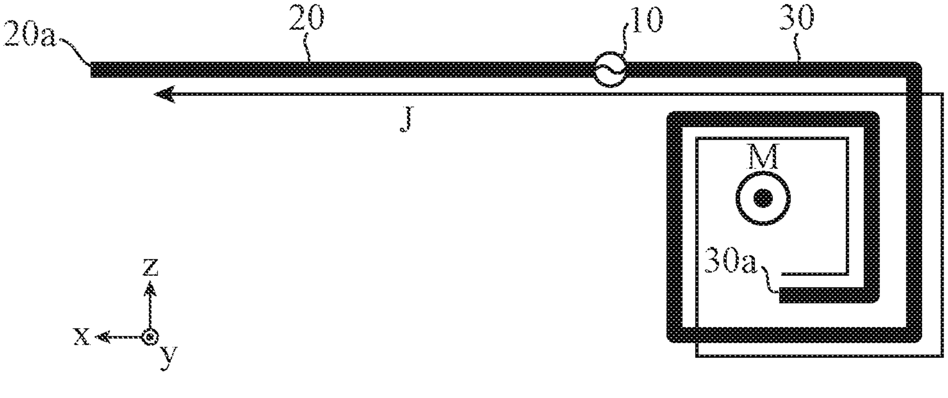
FIG. 2 is a diagram schematically illustrating a current distribution and an emission pattern in the antenna device according to the first embodiment.

At this time, as illustrated in FIG. 2, the first conductor 20 serves as an electric current source J, and the second conductor 30 serves as a magnetic current source M.

In the antenna device according to the first embodiment, it can be considered that an electromagnetic wave obtained by combining emission from the electric current source J by the first conductor 20 and emission from the magnetic current source M by the second conductor 30 is emitted into space.

Figure 3:
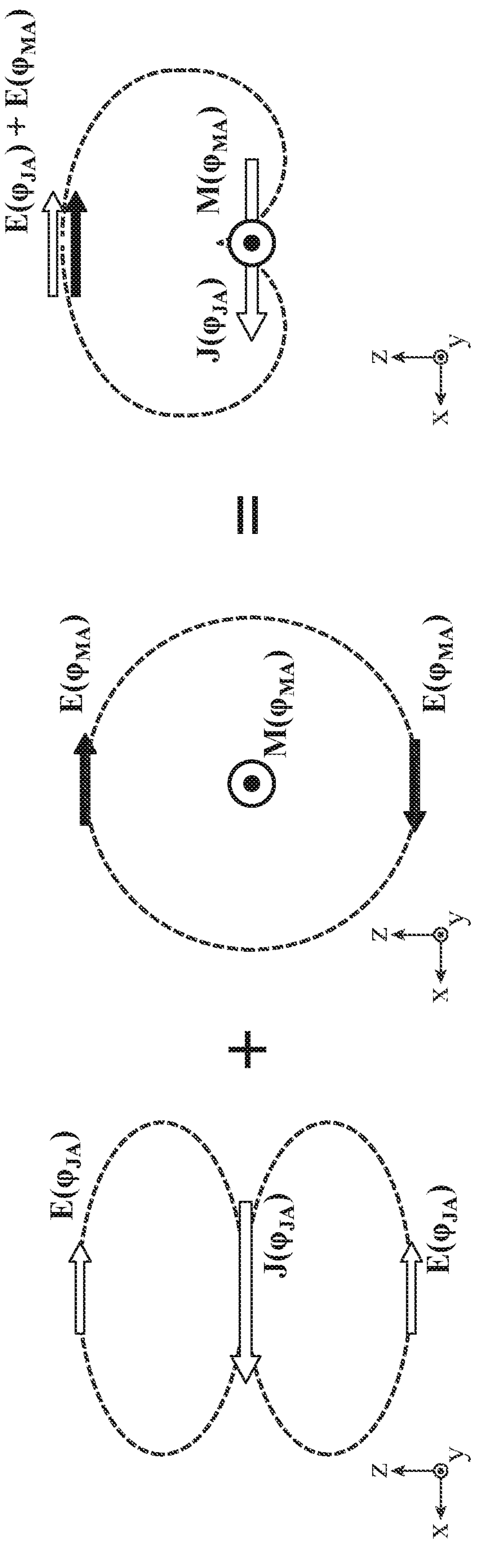
FIG. 3 is a conceptual diagram with an electric field emitted from an electric current source J and an electric field emitted from a magnetic current source M in the antenna device according to the first embodiment are combined.

That is, as illustrated in FIG. 3, in the emission from the electric current source J by the first conductor 20, an electric field intensity $E(\varphi_{JA})$ in the positive direction of the z-axis is the same as that in the negative direction of the z-axis, and phases thereof are the same (see (a) of FIG. 3).

Meanwhile, as illustrated in FIG. 3, in the emission from the magnetic current source M by the second conductor 30, an electric field intensity $E(\varphi_{MA})$ in the positive direction of the z-axis is the same as that in the negative direction of the z-axis as in the electric current source J, but phases thereof are opposite to each other (see (b) of FIG. 3).

Therefore, in the electromagnetic wave obtained by combining the emission from the electric current source J by the first conductor 20 and the emission from the magnetic current source M by the second conductor 30, since the electric current source J by the first conductor 20 and the magnetic current source M by the second conductor 30 are arranged orthogonal to each other, as illustrated in FIG. 3, the electric field in the positive direction of the z-axis is a sum of the electric field intensity $E(\varphi_{JA})$ and the electric field intensity $E(\varphi_{MA})$, and the electric fields in the negative direction of the z-axis are canceled out.

Figure 4:
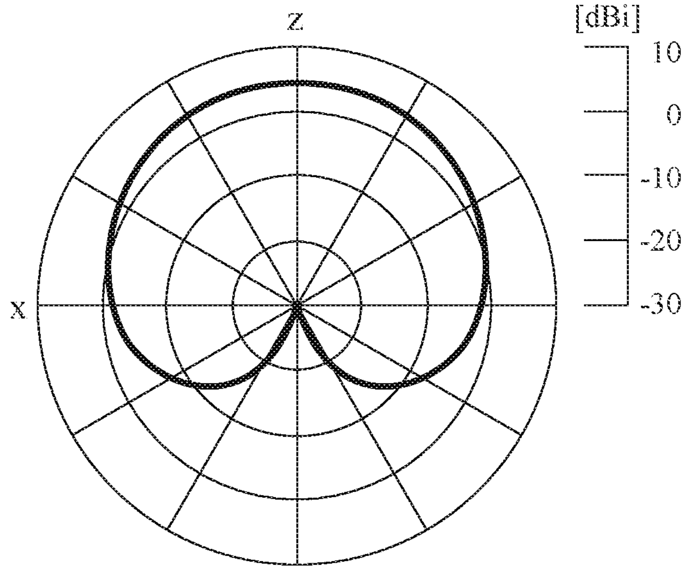
FIG. 4 is a diagram illustrating an emission pattern in the antenna device of the first embodiment.

When an emission pattern in the antenna device of the first embodiment was calculated, the emission pattern illustrated in FIG. 4 was obtained.

As can be understood from the result of FIG. 4, the antenna device of the first embodiment emits an electromagnetic wave having a unidirectional emission pattern.

As described above, since the antenna device according to the first embodiment includes the first conductor 20 extending linearly and the second conductor 30 extending spirally, the antenna device emits an electromagnetic wave that can reduce and suppress a back lobe to be emitted to an antenna rear side, that is, in the negative direction of the z-axis and that has a unidirectional emission pattern while being downsized.

That is, in the antenna device according to the first embodiment, when the entire length from the first open end 20*a* of the first conductor 20 to the second open end 30*a* of the second conductor 30 is within a range of 0.48 wavelength to 0.8 wavelength of a wavelength corresponding to a resonance frequency, a linearly polarized wave emission pattern having unidirectionality in the positive direction of the z-axis can be obtained while the antenna device is downsized.

Second Embodiment

An antenna device according to a second embodiment will be described with reference to FIG. 5.

The antenna device according to the second embodiment is different from the antenna device according to the first embodiment in that the spiral shape of a second conductor 31 in the antenna device according to the second embodiment is a circumferential shape while the spiral shape of the second conductor 30 in the antenna device according to the first embodiment is a rectangular shape, and is the same as the antenna device according to the first embodiment in the other points.

Figure 5:
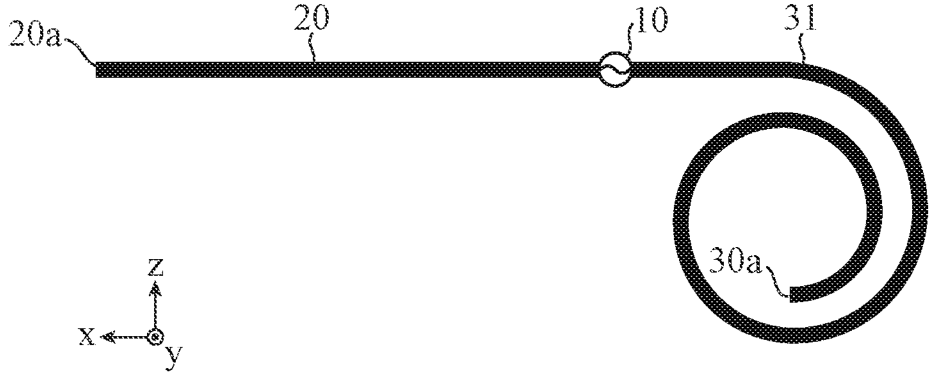
FIG. 5 is a front view illustrating an antenna device according to a second embodiment.

In FIG. 5, the same reference numerals as in FIG. 1 denote the same or corresponding portions.

The antenna device according to the second embodiment has a similar effect to the antenna device according to the first embodiment.

Third Embodiment

An antenna device according to a third embodiment will be described with reference to FIG. 6.

The antenna device according to the third embodiment is different from the antenna device according to the first embodiment in that the shape of a first conductor 21 in the antenna device according to the third embodiment is a meandering shape while the shape of the first conductor 20 in the antenna device according to the first embodiment is a linear shape, and is the same as the antenna device according to the first embodiment in the other points.

Figure 6:
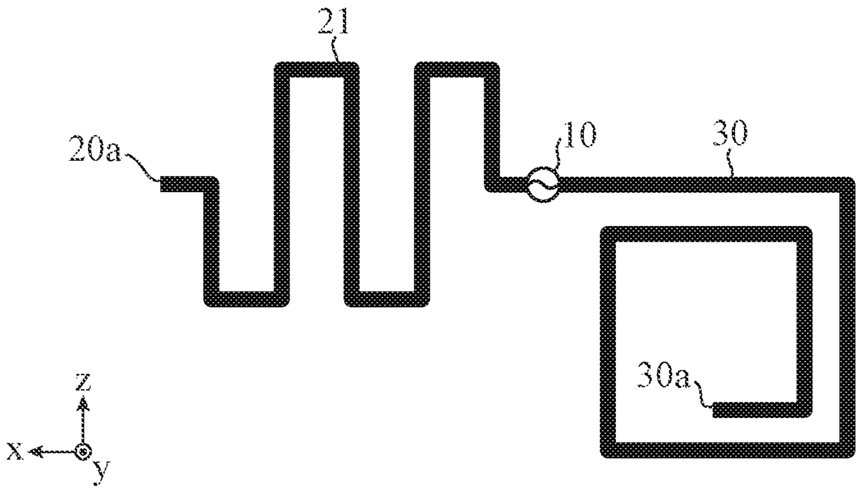
FIG. 6 is a front view illustrating an antenna device according to a third embodiment.

In FIG. 6, the same reference numerals as in FIG. 1 denote the same or corresponding portions.

The antenna device according to the third embodiment has a similar effect to the antenna device according to the first embodiment.

Note that the spiral shape of a second conductor 30 in the antenna device according to the third embodiment may be a circumferential shape similarly to the spiral shape of the second conductor 31 in the antenna device according to the second embodiment.

Fourth Embodiment

An antenna device according to a fourth embodiment will be described with reference to FIG. 7.

The antenna device according to the fourth embodiment is different from the antenna device according to the first embodiment in that the antenna device according to the fourth embodiment further includes a balance-unbalance converter 40 and a coaxial line 50, and is the same as the antenna device according to the first embodiment in the other points.

Figure 7:
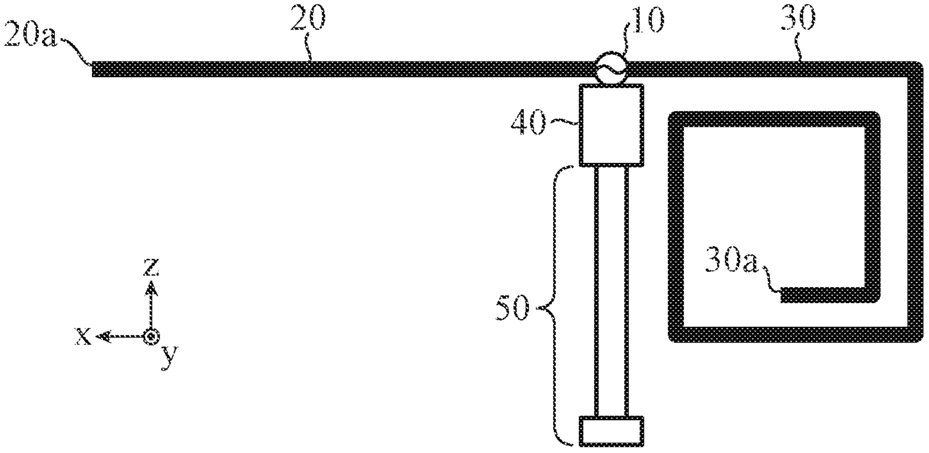
FIG. 7 is a front view illustrating an antenna device according to a fourth embodiment.

In FIG. 7, the same reference numerals as in FIG. 1 denote the same or corresponding portions.

The balance-unbalance converter 40 is a balun for balance-unbalance conversion and is connected to a feeding point 10.

The coaxial line 50 is a coaxial cable having an inner conductor and an outer conductor for supplying a high-frequency signal, and when first ends of the inner conductor and the outer conductor are connected to the balance-unbalance converter 40 and the antenna device functions as a transmission antenna, a high-frequency signal is input from a second end of the inner conductor. A second end of the outer conductor is grounded and shields the inner conductor.

Even when a high-frequency signal is input from the second end of the inner conductor in the coaxial line 50 and an unbalanced current flows on a surface of the outer conductor in the coaxial line 50, since the first ends of the inner conductor and the outer conductor in the coaxial line 50 are connected to the feeding point 10 via the balance-unbalance converter 40, an amplitude of a current flowing through a first conductor 20 is equal to an amplitude of a current flowing through a second conductor and there is no influence of emission from the first conductor 20 and the second conductor 30, caused by the unbalanced current flowing on the surface of the outer conductor in the coaxial line 50.

The antenna device according to the fourth embodiment can obtain an effect similar to that of the antenna device according to the first embodiment. In addition, the antenna device according to the fourth embodiment emits an electromagnetic wave that can reduce and suppress a back lobe to be emitted to an antenna rear side and that has a more accurate unidirectional emission pattern.

Note that, in the antenna device according to the fourth embodiment, the spiral shape of the second conductor 30 may be a circumferential shape as in the antenna device according to the second embodiment.

In addition, in the antenna device according to the fourth embodiment, the shape of the first conductor 20 may be a meandering shape as in the antenna device according to the third embodiment.

Fifth Embodiment

An antenna device according to a fifth embodiment will be described with reference to FIGS. 8 and 9.

The antenna device according to the fifth embodiment is different from the antenna device according to the first embodiment in that the antenna device according to the fifth embodiment is a monopole antenna-shaped antenna device while the antenna device according to the first embodiment is a dipole antenna-shaped antenna device, and is the same as the antenna device according to the first embodiment in the other points.

Figure 8:
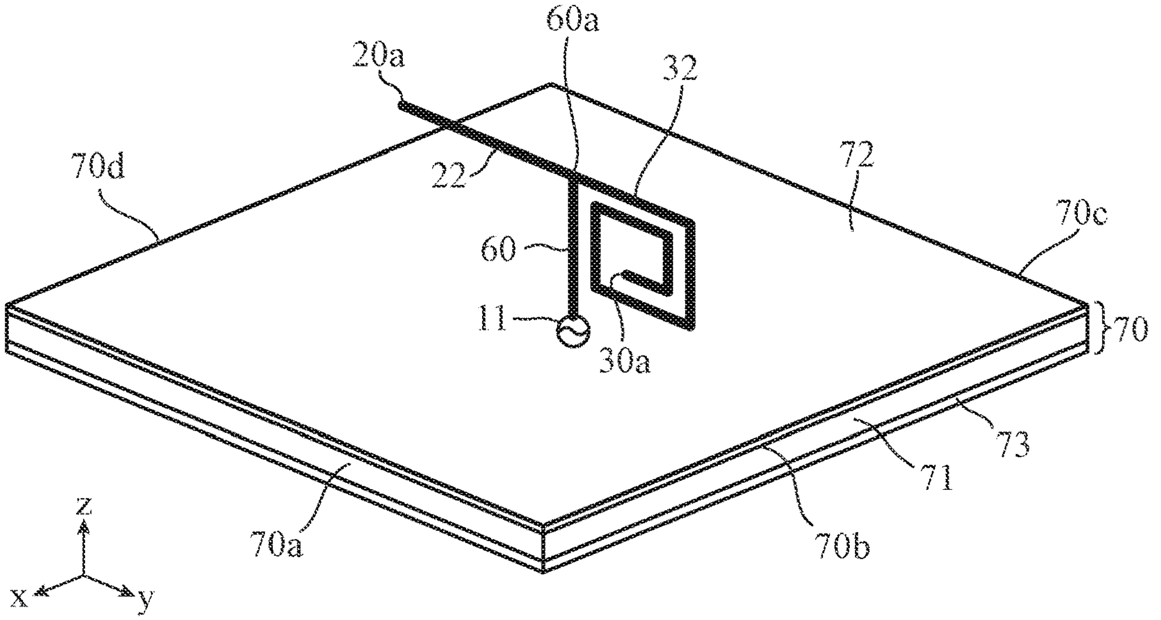
FIG. 8 is a perspective view illustrating an antenna device according to a fifth embodiment.
Figure 9:
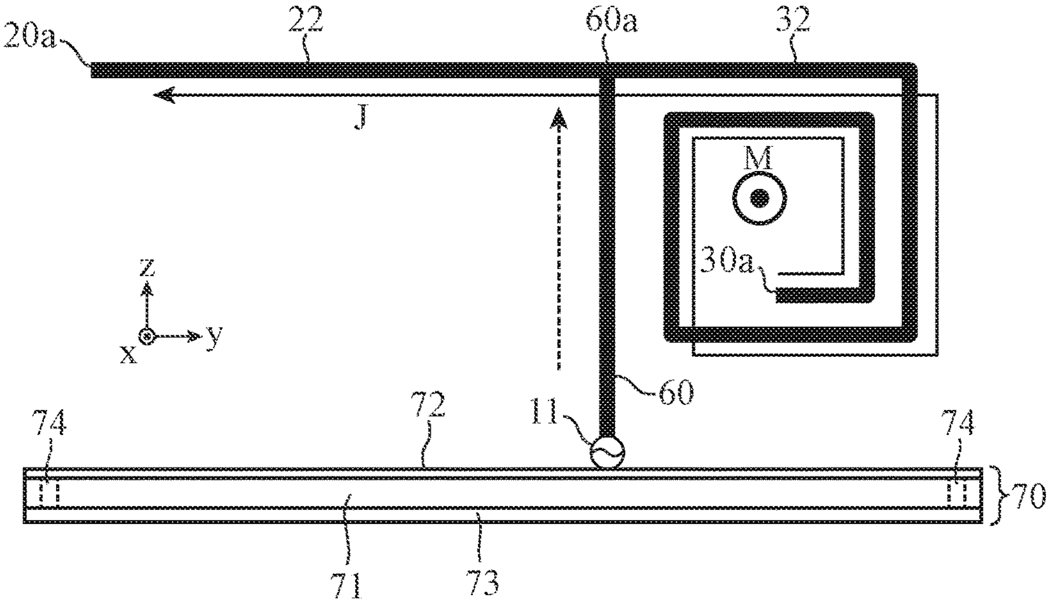
FIG. 9 is a diagram schematically illustrating a current distribution in mode 3 in the antenna device according to the fifth embodiment.

In FIGS. 8 and 9, the same reference numerals as in FIGS. 1 and 2 denote the same or corresponding portions.

The antenna device according to the fifth embodiment includes a feeding point 11, a first conductor 22, a second conductor 32, a third conductor 60, and a first ground conductor 72.

A first end of the third conductor 60 extends to the vicinity of a surface of the first ground conductor 72, and a second end of the third conductor 60 extends linearly to a branch point 60*a* in the zenith direction, that is, in the positive direction of the z-axis.

A connection point between the first end of the third conductor 60 and the surface of the first ground conductor 72 is the feeding point 11.

The feeding point 11 is a portion that excites a high-frequency signal, and is a gap formed between the third conductor 60 and the first ground conductor 72.

The feeding point 11 does not have to be formed as a physical component, and the first end of the third conductor 60 may be connected directly to the surface of the first ground conductor 72. In this case, a point at which the first end of the third conductor 60 is connected directly to the surface of the first ground conductor 72 is the feeding point 11.

The first ground conductor 72 is disposed on a front surface of a dielectric substrate 71. A second ground conductor 73 is disposed on a back surface of the dielectric substrate 71 in parallel with the first ground conductor 72. The first ground conductor 72 and the second ground conductor 73 are electrically connected to each other by a through hole 74.

The dielectric substrate 71, the first ground conductor 72, and the second ground conductor 73 constitute a ground conductor substrate 70.

The first conductor 22 is a conductor having a first end serving as a first open end 20*a* and extending linearly between the branch point 60*a* and the first open end 20*a* in the horizontal direction orthogonal to the zenith direction, that is, in FIG. 1, in a direction parallel to the y-axis similarly to the first conductor 20 in the antenna device according to the first embodiment.

The second conductor 32 is disposed on the same plane as the plane where the first conductor 22 is disposed, that is, on the y-z plane including the zenith direction.

The second conductor 32 has a first end serving as a second open end 30*a* and extends spirally between the branch point 60*a* and the second open end 30*a* in a direction different from a direction directed from the branch point 60*a* to the first open end 20*a*, in this example, in a direction opposite thereto, downward in the zenith direction, that is, toward the surface of the first ground conductor 72.

The first conductor 22, the second conductor 32, and the third conductor 60 are integrally molded conductors, and the first conductor 22 and the second conductor 32 are branched from the third conductor 60 at the branch point 60*a*.

Note that the second conductor 32 may be disposed on a plane orthogonal to the plane where the first conductor 22 is disposed, that is, the y-z plane, that is, may be disposed on the x-z plane.

The branch point 60*a* at which the third conductor 60 branches into the first conductor 22 and the second conductor 32 is a midpoint between the first open end 20*a* of the first conductor 22 and the second open end 30*a* of the second conductor 32.

An entire length from the feeding point 11 to the first open end 20*a* of the first conductor 22 is ¼ wavelength of a wavelength corresponding to a resonance frequency.

An entire length from the first open end 20*a* of the first conductor 22 to the second open end 30*a* of the second conductor 32 is ½ wavelength of a wavelength corresponding to a resonance frequency.

Note that the ¼ wavelength and the ½ wavelength do not strictly mean only the ¼ wavelength and the ½ wavelength, and include a plus/minus allowable range with respect to the ¼ wavelength and the ½ wavelength, respectively.

In the antenna device according to the fifth embodiment configured as described above, when a high-frequency signal is supplied to the feeding point 11, electromagnetic waves are emitted from the first conductor 22, the second conductor 32, and the third conductor 60.

In the first conductor 22, resonance caused by the wavelength reaching ¼ wavelength of a wavelength corresponding to a resonance frequency occurs. A mode in which resonance occurs in the first conductor 22 is referred to as mode 1.

Resonance in mode 2 is caused by the wavelength reaching ½ wavelength of a wavelength corresponding to an entire-length resonance frequency from the first open end 20*a* of the first conductor 22 to the second open end 30*a* of the second conductor 32, and setting the branch point 60*a* at which the third conductor 60 branches into the first conductor 22 and the second conductor 32 at a midpoint between the first open end of the first conductor 22 and the second open end 30*a* of the second conductor 32.

As illustrated in FIG. 9, resonance in mode 2 occurs between the first open end of the first conductor 22 and the second open end 30*a* of the second conductor 32.

At this time, as illustrated in FIG. 9, the first conductor 22 serves as an electric current source J, and the second conductor 32 serves as a magnetic current source M.

As in the antenna device according to the first embodiment, in the antenna device according to the fifth embodiment, an electromagnetic field emitted into space is a combination of emission from the electric current source J by the first conductor 22 and emission from the magnetic current source M by the second conductor 32, and electric fields in the negative direction of the z-axis are canceled out.

As a result, the antenna device according to the fifth embodiment emits an electromagnetic wave having a unidirectional emission pattern.

The antenna device according to the fifth embodiment has a similar effect to that of the antenna device according to the first embodiment.

Note that, in the antenna device according to the fifth embodiment, the spiral shape of the second conductor 32 may be a circumferential shape as in the antenna device according to the second embodiment.

In addition, in the antenna device according to the fifth embodiment, the shape of the first conductor 22 may be a meandering shape as in the antenna device according to the third embodiment.

Although described in detail in an antenna device according to a seventh embodiment described later, in an element antenna including a first conductor 20 extending linearly and a second conductor 30 extending spirally, when an entire length from a first open end 20*a* of the first conductor 20 to a second open end 30*a* of the second conductor 30 is within a range of 0.48 wavelength to 0.8 wavelength of a wavelength corresponding to a resonance frequency, an element antenna having a low cross polarized wave (left-handed circularly polarized wave (LHCP) and a high main polarized wave (right-handed circularly polarized wave (RHCP) can be obtained. Also in the antenna device according to the fifth embodiment, when an entire length from the first open end 20*a* of the first conductor 22 to the second open end 30*a* of the second conductor 32 is within a range of 0.48 wavelength to 0.8 wavelength of a wavelength corresponding to a resonance frequency, a favorable effect on a back lobe to be emitted to an antenna rear side can be obtained while the antenna device is downsized.

Sixth Embodiment

An antenna device according to a sixth embodiment will be described with reference to FIGS. 10 and 11.

The antenna device according to the sixth embodiment is different from the antenna device according to the fifth embodiment in that the antenna device according to the sixth embodiment includes a second conductor 33 that is a parasitic element while the antenna device according to the fifth embodiment is a monopole antenna-shaped antenna device, and is the same as the antenna device according to the fifth embodiment in the other points.

Figure 10:
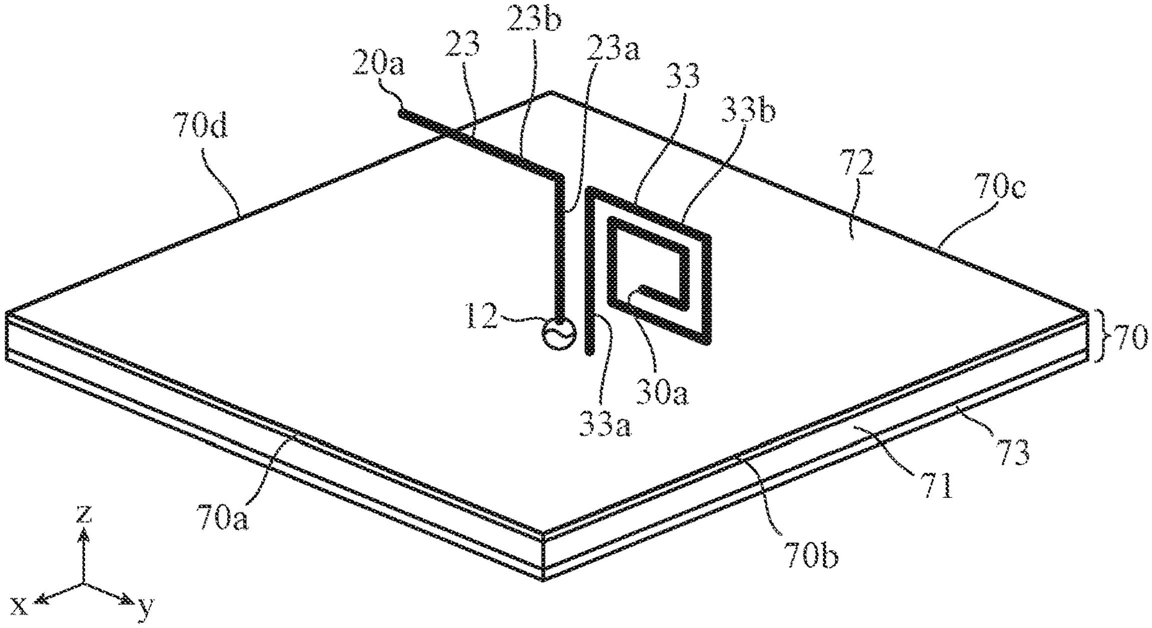
FIG. 10 is a perspective view illustrating an antenna device according to a sixth embodiment.
Figure 11:
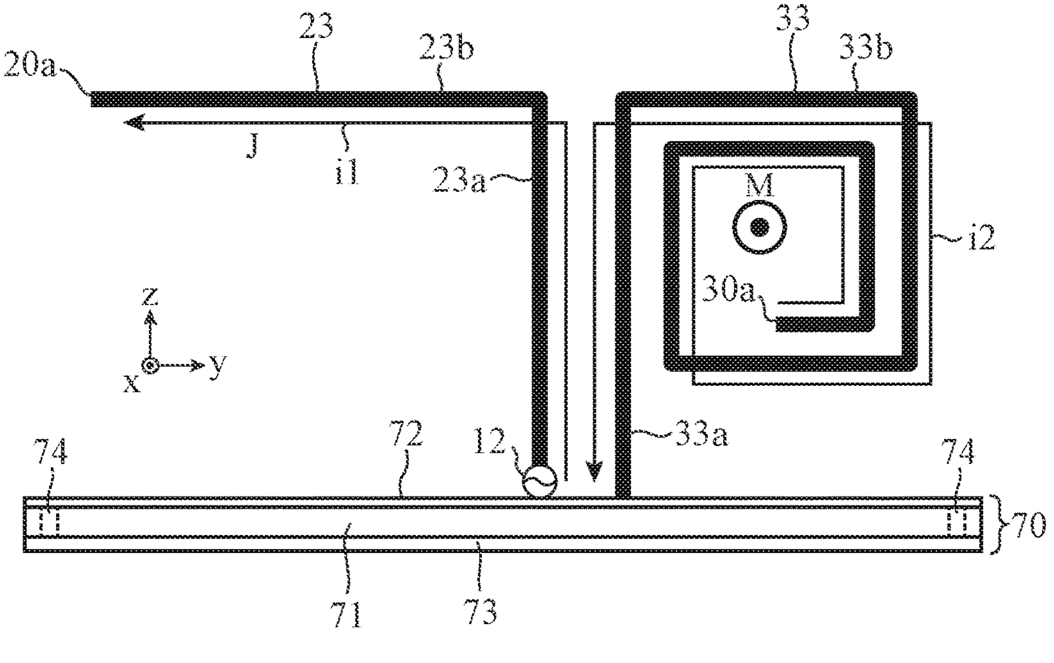
FIG. 11 is a diagram schematically illustrating a current distribution in the antenna device according to the sixth embodiment.

In FIGS. 10 and 11, the same reference numerals as in FIGS. 8 and 9 denote the same or corresponding portions.

The antenna device according to the sixth embodiment includes a feeding point 12, a first conductor 23, the second conductor 33, and a first ground conductor 72.

A first end of the first conductor 23 serves as a first open end 20*a*, and a second end of the first conductor 23 is connected to a surface of the first ground conductor 72.

The first conductor 23 has a first portion 23*a* extending from the first ground conductor 72 in the zenith direction, that is, in the positive direction of the z-axis, and a second portion 23*b* extending linearly in the horizontal direction orthogonal to the zenith direction, that is, in the y-axis direction, continuously from the first portion 23*a* to the first open end 20*a*.

An end of the first portion 23*a* is the second end of the first conductor 23, and an end of the second portion 23*b* is the first end of the first conductor 23.

The first conductor 23 is a feeding element that functions as an inverted L-shaped antenna element having a bending point between the feeding point 12 and the first open end 20*a*, that is, a bending point between the first portion 23*a* and the second portion 23*b*.

A connection point between the second end of the first conductor 23 and the surface of the first ground conductor 72 is the feeding point 12. The feeding point 12 is a portion that excites a high-frequency signal, and is a gap formed between the second end of the first conductor 23 and the surface of the first ground conductor 72.

The feeding point 12 does not have to be formed as a physical component, and the second end of the first conductor 23 may be connected directly to the surface of the first ground conductor 72. In this case, a point at which the second end of the first conductor 23 is connected directly to the surface of the first ground conductor 72 is the feeding point 12.

The second conductor 33 is disposed on the surface of the first ground conductor 72 adjacent to the first conductor 23 on the same plane as the plane where the first conductor 23 is disposed, that is, on the y-z plane including the zenith direction.

A first end of the second conductor 33 serves as a second open end 30*a*, and a second end of the second conductor 33 is connected to the surface of the first ground conductor 72.

The second conductor 33 has a third portion 33*a* disposed so as to face the first portion 23*a* of the first conductor 23 and extending from the surface of the first ground conductor 72 in the zenith direction, that is, in the positive direction of the z-axis, and a fourth portion 33*b* extending spirally in a direction different from and opposite to a direction in which the second portion 23*b* of the first conductor 23 goes toward the first open end 20*a*, downward in the zenith direction, that is, toward the surface of the first ground conductor 72, continuously from the third portion 33*a* to the second open end 30*a*.

An end of the third portion 33*a* is the second end of the second conductor 33, and an end of the fourth portion 33*b* is the first end of the second conductor 33.

The second conductor 33 is a parasitic element that functions as a spiral antenna element bent spirally.

When a direction in which the second portion 23*b* of the first conductor 23 is directed to the first open end 20*a* is the negative direction of the y-axis in FIG. 10, the different direction is a direction opposite to the directed direction and is the positive direction of the y-axis.

Note that the second conductor 33 may be disposed on a plane orthogonal to the plane where the first conductor 23 is disposed, that is, the y-z plane, that is, may be disposed on the x-z plane.

An entire length from the feeding point 12 to the first open end 20*a* of the first conductor 23, that is, an entire length of the first conductor 23 is ¼ wavelength of a wavelength corresponding to a resonance frequency.

An entire length from the second end of the second conductor 33 in contact with the surface of the first ground conductor 72 to the second open end 30*a* of the second conductor 33, that is, an entire length of the second conductor 33 is ¼ wavelength of a wavelength corresponding to a resonance frequency.

Note that the ¼ wavelength herein does not strictly mean only the ¼ wavelength, and includes a plus/minus allowable range with respect to the ¼ wavelength.

In the antenna device according to the sixth embodiment configured as described above, when a high-frequency signal is supplied to the feeding point 12, an electromagnetic wave is emitted from the first conductor 23.

In the first conductor 23, resonance caused by the wavelength reaching ¼ wavelength of a wavelength corresponding to a resonance frequency occurs.

Meanwhile, a current flows through the second conductor 33 due to electromagnetic coupling with the first conductor 23.

A current i2 flowing through the second conductor 33 has an amplitude equal to that of a current i1 flowing through the first conductor 23 and has a phase opposite to that of the current i1, and a current distribution of the current i1 flowing through the first conductor 23 and the current i2 flowing through the second conductor 33 is illustrated in FIG. 11.

Therefore, in the second conductor 33, resonance caused by the wavelength reaching ¼ wavelength of a wavelength corresponding to a resonance frequency occurs.

In the antenna device according to the sixth embodiment, as illustrated in FIG. 11, the first conductor 22 serves as an electric current source J, and the second conductor 32 serves as a magnetic current source M.

As in the antenna device according to the fifth embodiment, in the antenna device according to the sixth embodiment, an electromagnetic field emitted into space is a combination of emission from the electric current source J by the first conductor 22 and emission from the magnetic current source M by the second conductor 32, and electric fields in the negative direction of the z-axis are canceled out.

As a result, the antenna device according to the sixth embodiment emits an electromagnetic wave having a unidirectional emission pattern.

The antenna device according to the sixth embodiment has a similar effect to the antenna device according to the fifth embodiment even in a case where the second conductor 32 serving as the magnetic current source M is a parasitic element.

Note that, in the antenna device according to the sixth embodiment, the spiral shape of the second conductor 33 may be a circumferential shape as in the antenna device according to the second embodiment.

In addition, in the antenna device according to the sixth embodiment, the shape of the second portion 23*b* of the first conductor 23 may be a meandering shape as in the antenna device according to the third embodiment.

Seventh Embodiment

An antenna device according to a seventh embodiment will be described with reference to FIGS. 12 to 14.

The antenna device according to the seventh embodiment is an antenna device that emits a circularly polarized wave using a plurality of the monopole antenna-shaped antenna devices according to the fifth embodiment as element antennas.

Figure 12:
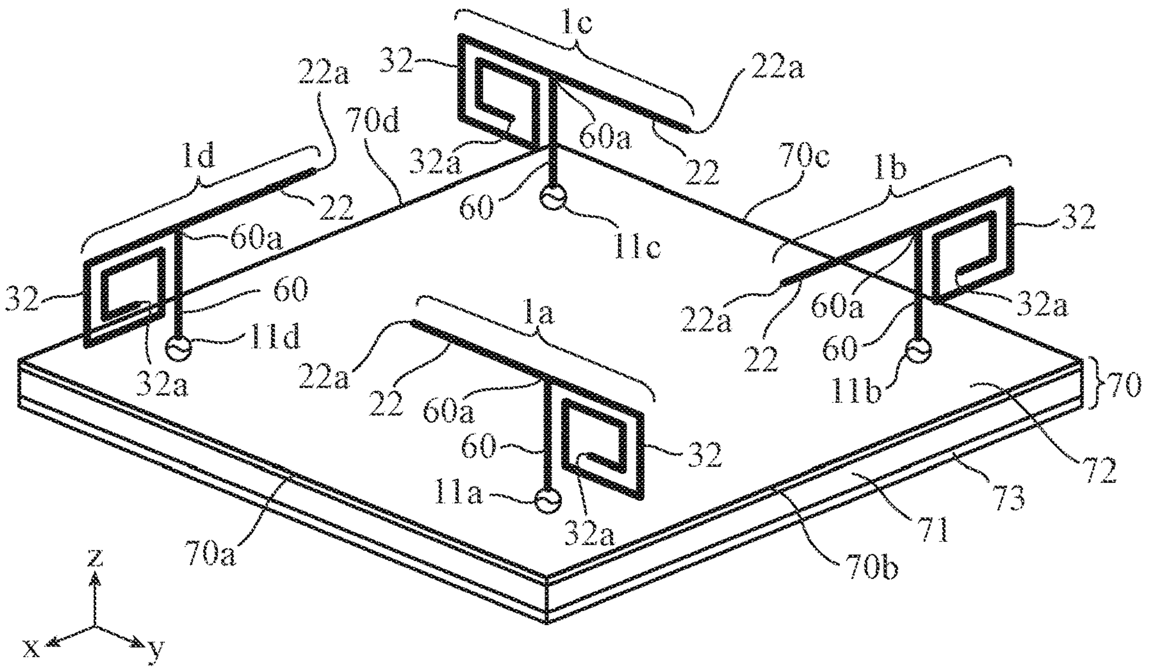
FIG. 12 is a perspective view illustrating an antenna device according to a seventh embodiment.

In FIG. 12, the same reference numerals as in FIG. 8 denote the same or corresponding portions.

The antenna device according to the seventh embodiment includes a ground conductor substrate 70, a plurality of element antennas 1*a* to 1*d*, a coaxial line 80, and an interface circuit 90.

The ground conductor substrate 70 includes a rectangular dielectric substrate 71, a first ground conductor 72, and a second ground conductor 73.

The first ground conductor 72 is disposed on a front surface of a dielectric substrate 71. The second ground conductor 73 is disposed on a back surface of the dielectric substrate 71 in parallel with the first ground conductor 72.

The number of element antennas 1*a* to 1*d* is four in the antenna device according to the seventh embodiment. Note that the number is not limited to four, and only needs to be two or more as long as a circularly polarized wave can be emitted.

The plurality of element antennas 1*a* to 1*d* are arranged at different positions on a surface of the first ground conductor 72 of the ground conductor substrate 70, and are connected to corresponding feeding points 11*a* to 11*d*, respectively.

The feeding points 11*a* to 11*d* are portions that excite high-frequency signals with respect to the corresponding element antennas 1a to 1d, respectively, and do not have to be formed as physical components.

In the antenna device according to the seventh embodiment, the four element antennas 1a to 1d are arranged rotationally symmetrically by 90 degrees. Specifically, in the four element antennas 1a to 1d, the corresponding feeding points 11a to 11d are arranged at four corners on the surface of the first ground conductor 72 of the ground conductor substrate 70, respectively.

In a case where the element antennas 1a to 1d function as transmission antennas, high-frequency signals supplied to the corresponding feeding points 11a to 11d are input to the element antennas 1a to 1d from the corresponding feeding points 11a to 11d, respectively, and in a case where the element antennas 1a to 1d function as reception antennas, the element antennas 1a to 1d output high-frequency signals based on received electromagnetic waves to the corresponding feeding points 11a to 11d, respectively.

An operation is reversible in a case where the element antennas 1a to 1d function as transmission antennas and in a case where the element antennas 1a to 1d function as reception antennas.

In the following description, in order to avoid complexity, a case where the element antennas 1a to 1d function as transmission antennas will be described.

The coaxial line 80 includes an inner conductor 80a that transmits a high-frequency signal and an outer conductor 80b that surrounds the inner conductor 80a with a plurality of through conductors and shields the inner conductor 80a.

In the coaxial line 80, the inner conductor 80a penetrates a through hole formed at the center of the dielectric substrate 71 in the ground conductor substrate 70.

The plurality of through conductors constituting the outer conductor 80b of the coaxial line 80 is connected to the first ground conductor 72 and the second ground conductor 73, and makes the first ground conductor 72 and the second ground conductor 73 conductive to each other.

By the coaxial line 80 penetrating the through hole formed at the center of the dielectric substrate 71 in the ground conductor substrate 70, a high-frequency signal can be fed from the second ground conductor 73 side in the ground conductor substrate 70.

The interface circuit 90 functions as at least one of a combining circuit that connects the feeding points 11a to 11d to which the plurality of element antennas 1a to 1d are connected to the coaxial line 80, turns high-frequency signals having different phases, output from the plurality of element antennas 1a to 1d into the same phase and combines the high-frequency signals, and outputs the combined high-frequency signal to the inner conductor of the coaxial line 80, and a dividing circuit that divides the high-frequency signal transmitted by the coaxial line 80 into a plurality of signals having different phases, and outputs the divided high-frequency signals to the plurality of element antennas 1a to 1d, respectively.

The interface circuit 90 functions as the dividing circuit in a case where the element antennas 1a to 1d function as transmission antennas, and functions as the combining circuit in a case where the element antennas 1a to 1d function as reception antennas.

The interface circuit 90 includes a 180 degree hybrid 91 and two 90 degree hybrids 92a and 92b. The interface circuit 90 is patterned by etching on the surface of the first ground conductor 72.

In a case where the plurality of element antennas 1a to 1d function as transmission antennas, the 180 degree hybrid 91 divides a high-frequency signal transmitted by the coaxial line 80 into two high-frequency signals having phases different by 180 degrees, outputs one of the high-frequency signals to the first 90 degree hybrid 92a, and outputs the other high-frequency signal to the second 90 degree hybrid 92b.

For example, when the high-frequency signal transmitted by the coaxial line 80 has a phase of 0 degrees, the 180 degree hybrid 91 divides the high-frequency signal into a high-frequency signal having a phase of 0 degrees and a high-frequency signal having a phase of 180 degrees.

The first 90 degree hybrid 92a divides the one high-frequency signal divided from the 180 degree hybrid 91 into two high-frequency signals having phases different by 90 degrees, outputs one of the high-frequency signals to the feeding point 11a for the first element antenna 1a, and outputs the other high-frequency signal to the feeding point 11d for the fourth element antenna 1d.

For example, when the one high-frequency signal divided from the 180 degree hybrid 91 has a phase of 0 degrees, the first 90 degree hybrid 92a divides the high-frequency signal into a high-frequency signal having a phase of 0 degrees and a high-frequency signal having a phase of 90 degrees.

The second 90 degree hybrid 92b divides the other high-frequency signal divided from the 180 degree hybrid 91 into two high-frequency signals having phases different by 90 degrees, outputs one of the high-frequency signals to the feeding point 11b for the second element antenna 1b, and outputs the other high-frequency signal to the feeding point 11c for the third element antenna 1c.

For example, when the other high-frequency signal divided from the 180 degree hybrid 91 has a phase of 180 degrees, the second 90 degree hybrid 92b divides the high-frequency signal into a high-frequency signal having a phase of 180 degrees and a high-frequency signal having a phase of 270 degrees.

A high-frequency signal transmitted by the coaxial line 80 is converted into signals having phases different from each other by 90 degrees by the interface circuit 90, and the signals are supplied to the first element antenna 1a to the fourth element antenna 1d. Electromagnetic waves corresponding to the high-frequency signals are emitted into space by a resonance phenomenon that occurs when the high-frequency signals are transmitted through the element antennas 1a to 1d.

For example, when the high-frequency signal transmitted by the coaxial line 80 has a phase of 0 degrees, a high-frequency signal having a phase of 0 degrees is supplied to the first element antenna 1a, a high-frequency signal having a phase of 90 degrees is supplied to the fourth element antenna 1d, a high-frequency signal having a phase of 180 degrees is supplied to the second element antenna 1b, and a high-frequency signal having a phase of 270 degrees is supplied to the third element antenna 1c.

Each of the plurality of element antennas 1a to 1d has a similar configuration to the antenna device according to the fifth embodiment.

That is, each of the plurality of element antennas 1a to 1d includes a first conductor 22, a second conductor 32, and a third conductor 60.

A first end of the third conductor 60 is connected to the first ground conductor 72, and the third conductor 60 extends linearly from the first ground conductor 72 to a branch point 60a in the zenith direction, that is, in the positive direction of the z-axis.

A connection point between the first end of the third conductor 60 and the first ground conductor 72 is each of the feeding points 11a to 11d.

The first conductor 22 is a conductor having a first end serving as a first open end 22*a* and extending linearly between the branch point 60*a* and the first open end 22*a* in the horizontal direction orthogonal to the zenith direction, that is, in FIG. 12, in a direction along one side of the ground conductor substrate 70.

The second conductor 32 is disposed on the same plane as the plane where the first conductor 22 is disposed, that is, on the y-z plane or the x-z plane including the zenith direction.

The second conductor 32 has a first end serving as a second open end 32*a* and extends spirally between the branch point 60*a* and the second open end 32*a* in a direction different from a direction directed from the branch point 60*a* to the first open end 22*a*, in this example, in a direction opposite thereto, downward in the zenith direction, that is, toward the surface of the first ground conductor 72.

Specifically, the planar shape of the ground conductor substrate 70 is a rectangular shape having a first side 70*a* to a fourth side 70*d*.

The first element antenna 1*a* has the feeding point 11*a* at a corner formed by the first side 70*a* and the second side 70*b* of the ground conductor substrate 70.

The first element antenna 1*a* is disposed along the first side 70*a* of the ground conductor substrate 70, and the first conductor 22, the second conductor 32, and the third conductor 60 in the first element antenna 1*a* are arranged on the same plane, that is, on the y-z plane.

The first conductor 22 in the first element antenna 1*a* is located close to the fourth side 70*d* of the ground conductor substrate 70 with respect to the second conductor 32 in the first element antenna 1*a*.

The second element antenna 1*b* has the feeding point 11*b* at a corner formed by the second side 70*b* and the third side 70*c* of the ground conductor substrate 70.

The second element antenna 1*b* is disposed along the second side 70*b* of the ground conductor substrate 70, and the first conductor 22, the second conductor 32, and the third conductor 60 in the second element antenna 1*b* are arranged on the same plane, that is, on the x-z plane.

The first conductor 22 in the second element antenna 1*b* is located close to the first side 70*a* of the ground conductor substrate 70 with respect to the second conductor 32 in the second element antenna 1*b*.

The third element antenna 1*c* has the feeding point 11*c* at a corner formed by the third side 70*c* and the fourth side 70*d* of the ground conductor substrate 70.

The third element antenna 1*c* is disposed along the third side 70*c* of the ground conductor substrate 70, and the first conductor 22, the second conductor 32, and the third conductor 60 in the third element antenna 1*c* are arranged on the same plane, that is, on the y-z plane.

The first conductor 22 in the third element antenna 1*c* is located close to the second side 70*b* of the ground conductor substrate 70 with respect to the second conductor 32 in the third element antenna 1*c*.

The fourth element antenna 1*d* has the feeding point 11*d* at a corner formed by the fourth side 70*d* and the first side 70*a* of the ground conductor substrate 70.

The fourth element antenna 1*d* is disposed along the fourth side 70*d* of the ground conductor substrate 70, and the first conductor 22, the second conductor 32, and the third conductor 60 in the fourth element antenna 1*d* are arranged on the same plane, that is, on the x-z plane.

The first conductor 22 in the fourth element antenna 1*d* is located close to the third side 70*c* of the ground conductor substrate 70 with respect to the second conductor 32 in the fourth element antenna 1*d*.

In the antenna device according to the seventh embodiment, in a case where the first element antenna 1*a* to the fourth element antenna 1*d* function as transmission antennas, a high-frequency signal transmitted by the coaxial line 80 is converted into signals having phases different from each other by 90 degrees by the interface circuit and the signals are supplied to the first element antenna 1*a* to the fourth element antenna 1*d*.

In the first element antenna 1*a* to the fourth element antenna 1*d*, due to a resonance phenomenon that occurs when the supplied high-frequency signals are transmitted through the first element antenna 1*a* to the fourth element antenna 1*d*, electromagnetic waves corresponding to the high-frequency signals are emitted from all of the first element antenna 1*a* to the fourth element antenna 1*d* into space.

In this case, since phases of the signals transmitted through the first element antenna 1*a* to the fourth element antenna 1*d* are different from each other by 90 degrees, a right-handed circularly polarized wave (RHCP) is emitted in a direction in which the first ground conductor 72 is viewed from the second ground conductor 73.

In addition, when the phases of the high-frequency signals output from the first degree hybrid 92*a* and the second 90 degree hybrid 92*b* are reversed, a left-handed circularly polarized wave (LHCP) is emitted in a direction in which the first ground conductor 72 is viewed from the second ground conductor 73.

Figure 14:
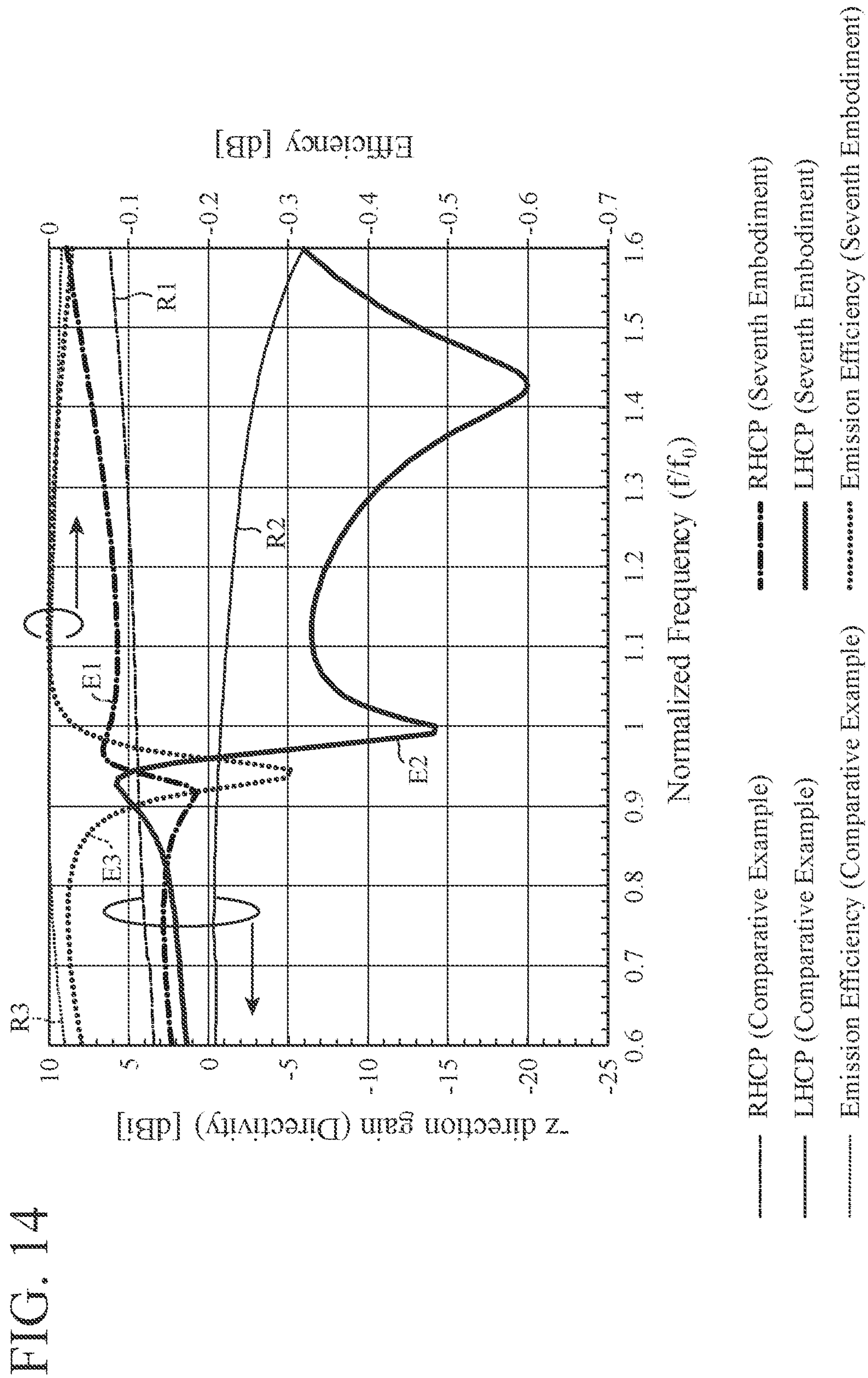
FIG. 14 is a diagram illustrating numerical analysis results of the element antennas in the antenna device according to the seventh embodiment.

FIG. 14 illustrates an example of numerical analysis results of a main polarized wave (RHCP) emitted in the positive direction of the z-axis, a cross polarized wave (LHCP) emitted in the negative direction of the z axis, and emission efficiency of each of the element antennas 1*a* to 1*d* in the antenna device according to the seventh embodiment.

In FIG. 14, the horizontal axis indicates a normalized frequency, and the vertical axis indicates a peak gain (direction gain) of each of the main polarized wave (RHCP) and the cross polarized wave (LHCP). The main polarized wave (RHCP) means a gain in the positive direction of the z-axis, and the cross polarized wave (LHCP) means a gain in the negative direction of the z-axis.

In addition, in FIG. 14, the dashed-dotted line indicates the main polarized wave (RHCP), the solid line indicates the cross polarized wave (LHCP), the dotted line indicates the emission efficiency, the thick line indicates the numerical analysis result of each of the element antennas 1*a* to 1*d* in the antenna device according to the seventh embodiment, and the thin line indicates a numerical analysis result of a comparative example.

That is, the dashed-dotted bold line E1 indicates the numerical analysis result of the main polarized wave (RHCP) of each of the element antennas 1*a* to 1*d* in the antenna device according to the seventh embodiment, the solid thick line E2 indicates the numerical analysis result of the cross polarized wave (LHCP) of each of the element antennas 1*a* to 1*d* in the antenna device according to the seventh embodiment, and the dotted thick line E3 indicates the numerical analysis result of the emission efficiency of each of the element antennas 1*a* to 1*d* in the antenna device according to the seventh embodiment.

The dashed-dotted thin line R1 indicates the numerical analysis result of the main polarized wave (RHCP) in the comparative example, the solid thin line R2 indicates the numerical analysis result of the cross polarized wave (LHCP) in the comparative example, and the dotted thin line R3 indicates the numerical analysis result of the emission efficiency in the comparative example.

The element antenna in the comparative example includes only a linear first conductor, and does not include the spirally extending second conductor 32 of each of the element antennas 1*a* to 1*d* in the antenna device according to the seventh embodiment.

As is clear from FIG. 14, in each of the element antennas 1*a* to 1*d* in the antenna device according to the seventh embodiment, in a case where an entire length from the first open end 22*a* of the first conductor 22 to the second open end 32*a* of the second conductor 32 is ½ wavelength of a wavelength corresponding to a resonance frequency, that is, $f/f_0=1$ is satisfied, the cross polarized wave (LHCP) E2 has a very low value with respect to the cross polarized wave (LHCP) R2 of the comparative example, and the main polarized wave (RHCP) E1 is higher than the main polarized wave (RHCP) R1 of the comparative example.

That is, each of the element antennas 1*a* to 1*d* includes the first conductor 22 extending linearly and the second conductor extending spirally, and therefore a back lobe to be emitted to an antenna rear side can be suppressed in the element antennas 1*a* to 1*d*.

Specifically, when $f/f_0$ is within a range of $0.96<(f/f_0)<1.6$, that is, when the entire length from the first open end 22*a* of the first conductor 22 to the second open end 32*a* of the second conductor 32 is within a range of 0.48 wavelength to 0.8 wavelength of a wavelength corresponding to a resonance frequency, each of the element antennas 1*a* to 1*d* in the antenna device according to the seventh embodiment has a lower cross polarized wave (LHCP) E2 and a higher main polarized wave (RHCP) E1 than that in the comparative example.

In addition, the lowest emission efficiency of each of the element antennas 1*a* to 1*d* in the antenna device according to the seventh embodiment is −0.3 dB, which has little influence on the antenna gain.

Therefore, when the entire length from the first open end 22*a* of the first conductor 22 to the second open end 32*a* of the second conductor 32 is within a range of 0.48 wavelength to 0.8 wavelength of a wavelength corresponding to a resonance frequency, a back lobe to be emitted to an antenna rear side can be suppressed in the element antennas 1*a* to 1*d*.

As described above, a back lobe to be emitted to an antenna rear side can be suppressed in the element antennas 1*a* to 1*d*. Therefore, also in the antenna device according to the seventh embodiment in which the element antennas 1*a* to 1*d* are arranged rotationally symmetrically and a circularly polarized wave is emitted, emission of a cross polarized wave emitted to the antenna rear side can be suppressed, and a back lobe to be emitted to the antenna rear side can be suppressed in the element antennas 1*a* to 1*d*.

Note that, in the antenna device according to the seventh embodiment, the spiral shape of the second conductor 32 in each of the element antennas 1*a* to 1*d* may be a circumferential shape as in the antenna device according to the second embodiment.

In addition, in the antenna device according to the seventh embodiment, the shape of the first conductor 22 in each of the element antennas 1*a* to 1*d* may be a meandering shape as in the antenna device according to the third embodiment.

As described above, in the antenna device according to the seventh embodiment, each of the element antennas 1*a* to 1*d* used for emitting a circularly polarized wave and arranged at different positions on the surface of the first ground conductor 72 includes the first conductor 22 extending linearly and the second conductor 32 extending spirally. Therefore, the antenna device according to the seventh embodiment emits a circularly polarized wave that can reduce and suppress a cross polarized wave to be emitted to an antenna rear side, that is, a back lobe to be emitted to the antenna rear side in the element antennas 1*a* to 1*d* while being downsized. Eighth embodiment.

An antenna device according to an eighth embodiment will be described with reference to FIGS. 15 and 16.

The antenna device according to the eighth embodiment is different from the antenna device according to the seventh embodiment in that the antenna device according to the eighth embodiment uses the antenna devices according to the sixth embodiment as element antennas in place of the plurality of element antennas 1*a* to 1*d* in the antenna device according to the seventh embodiment, and is the same as the antenna device according to the seventh embodiment in the other points.

Figure 13:
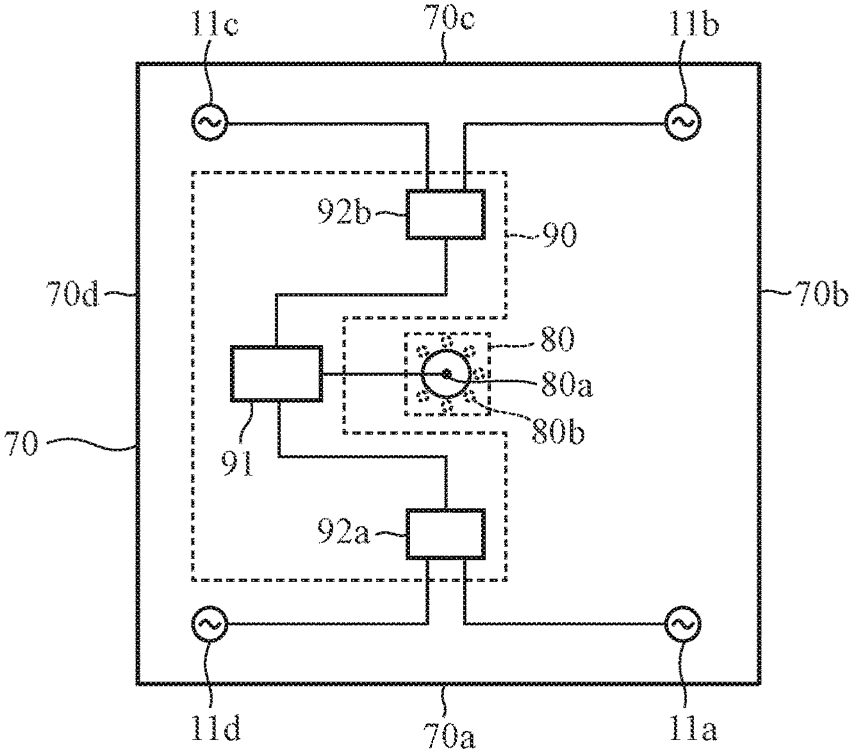
FIG. 13 is a plan view illustrating the antenna device according to the seventh embodiment with a plurality of element antennas omitted.
Figure 15:
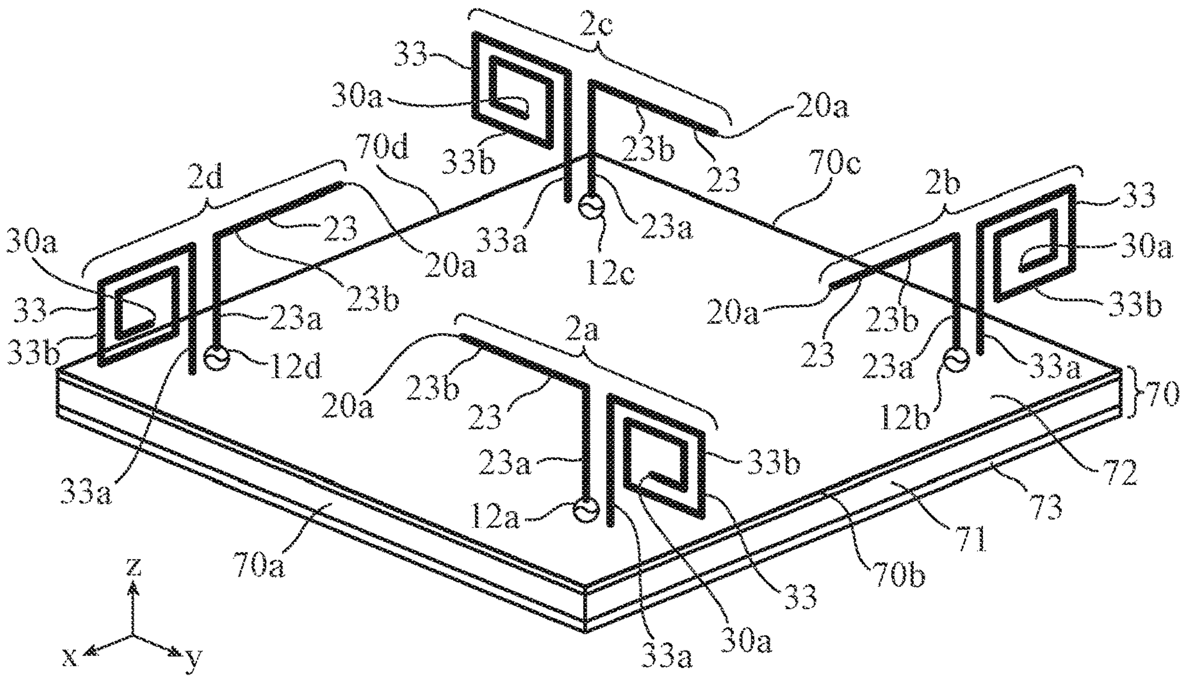
FIG. 15 is a perspective view illustrating an antenna device according to an eighth embodiment.
Figure 16:
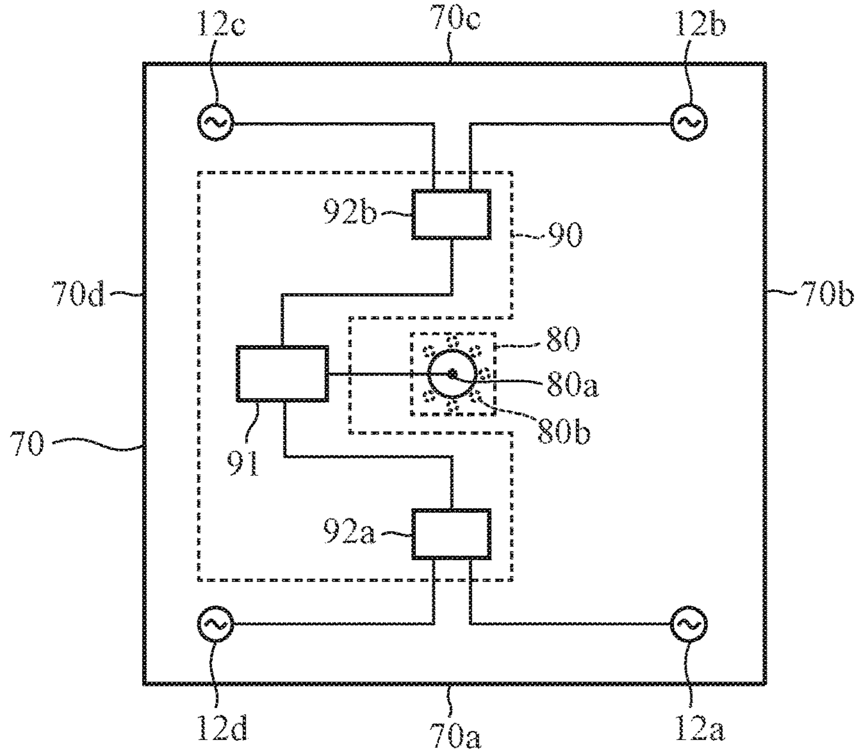
FIG. 16 is a plan view illustrating the antenna device according to the eighth embodiment with a plurality of element antennas omitted.

In FIGS. 15 and 16, the same reference numerals as in FIGS. 12 and 13 denote the same or corresponding portions.

The antenna device according to the eighth embodiment includes a ground conductor substrate 70, a plurality of element antennas 2*a* to 2*d*, a coaxial line 80, and an interface circuit 90.

The plurality of element antennas 2*a* to 2*d* are arranged at different positions on a surface of the first ground conductor 72 of the ground conductor substrate 70, and are connected to corresponding feeding points 12*a* to 12*d*, respectively.

The feeding points 12*a* to 12*d* are portions that excite high-frequency signals with respect to the corresponding element antennas 2*a* to 2*d*, respectively, and do not have to be formed as physical components.

A high-frequency signal transmitted by the coaxial line 80 is converted into signals having phases different from each other by 90 degrees by the interface circuit and the signals are supplied to the first element antenna 2*a* to the fourth element antenna 2*d*. Electromagnetic waves corresponding to the high-frequency signals are emitted into space by a resonance phenomenon that occurs when the high-frequency signals are transmitted through the element antennas 2*a* to 2*d*.

For example, when the high-frequency signal transmitted by the coaxial line 80 has a phase of 0 degrees, a high-frequency signal having a phase of 0 degrees is supplied to the first element antenna 2*a*, a high-frequency signal having a phase of 90 degrees is supplied to the fourth element antenna 2*d*, a high-frequency signal having a phase of 180 degrees is supplied to the second element antenna 2*b*, and a high-frequency signal having a phase of 270 degrees is supplied to the third element antenna 2*c*.

Each of the plurality of element antennas 2*a* to 2*d* has a similar configuration to the antenna device according to the sixth embodiment.

That is, each of the plurality of element antennas 2*a* to 2*d* includes a first conductor 23 and a second conductor 33.

A first end of the first conductor 23 serves as a first open end 20*a*, and a second end of the first conductor 23 is connected to a surface of the first ground conductor 72.

The first conductor 23 has a first portion 23*a* extending from the first ground conductor 72 in the zenith direction, that is, in the positive direction of the z-axis, and a second portion 23*b* extending linearly in the horizontal direction orthogonal to the zenith direction, that is, in FIG. 15, in a direction along one side of the ground conductor substrate 70, continuously from the first portion 23*a* to the first open end 20*a*.

An end of the first portion 23*a* is the second end of the first conductor 23, and an end of the second portion 23*b* is the first end of the first conductor 23.

The first conductor 23 is a feeding element that functions as an inverted L-shaped antenna element having a bending point between the feeding point 12 and the first open end 20*a*, that is, a bending point between the first portion 23*a* and the second portion 23*b*.

A connection point between the second end of the first conductor 23 and the surface of the first ground conductor 72 is each of the feeding points 12*a* to 12*d*.

The second conductor 33 is disposed on the surface of the first ground conductor 72 adjacent to the first conductor 23 on the same plane as the plane where the first conductor 23 is disposed, that is, on the y-z plane or the x-z plane including the zenith direction.

A first end of the second conductor 33 serves as a second open end 30*a*, and a second end of the second conductor 33 is connected to the surface of the first ground conductor 72.

The second conductor 33 has a third portion 33*a* disposed so as to face the first portion 23*a* of the first conductor 23 and extending from the first ground conductor 72 in the zenith direction, that is, in the positive direction of the z-axis, and a fourth portion 33*b* extending spirally in a direction different from and opposite to a direction in which the second portion 23*b* of the first conductor 23 goes toward the first open end 20*a*, downward in the zenith direction, that is, toward the surface of the first ground conductor 72, continuously from the third portion 33*a* to the second open end 30*a*.

An end of the third portion 33*a* is the second end of the second conductor 33, and an end of the fourth portion 33*b* is the first end of the second conductor 33.

The second conductor 33 is a parasitic element that functions as a spiral antenna element bent spirally.

In each of the plurality of element antennas 2*a* to 2*d*, an entire length from the feeding point 12 to the first open end 20*a* of the first conductor 23, that is, an entire length of the first conductor 23 is ¼ wavelength of a wavelength corresponding to a resonance frequency.

An entire length from the second end of the second conductor 33 in contact with the surface of the first ground conductor 72 to the second open end 30*a* of the second conductor 33, that is, an entire length of the second conductor 33 is ¼ wavelength of a wavelength corresponding to a resonance frequency.

Note that the ¼ wavelength herein does not strictly mean only the ¼ wavelength, and includes a plus/minus allowable range with respect to the ¼ wavelength.

The first element antenna 2*a* has the feeding point 12*a* at a corner formed by the first side 70*a* and the second side 70*b* of the ground conductor substrate 70.

The first element antenna 2*a* is disposed along the first side 70*a* of the ground conductor substrate 70, and the first conductor 23 and the second conductor 33 in the first element antenna 2*a* are arranged on the same plane, that is, on the y-z plane.

The first conductor 23 in the first element antenna 2*a* is located close to the fourth side 70*d* of the ground conductor substrate 70 with respect to the second conductor 33 in the first element antenna 2*a*.

The second element antenna 2*b* has the feeding point 12*b* at a corner formed by the second side 70*b* and the third side 70*c* of the ground conductor substrate 70.

The second element antenna 2*b* is disposed along the second side 70*b* of the ground conductor substrate 70, and the first conductor 23 and the second conductor 33 in the second element antenna 2*b* are arranged on the same plane, that is, on the x-z plane.

The first conductor 23 in the second element antenna 2*b* is located close to the first side 70*a* of the ground conductor substrate 70 with respect to the second conductor 33 in the second element antenna 2*b*.

The third element antenna 2*c* has the feeding point 12*c* at a corner formed by the third side 70*c* and the fourth side 70*d* of the ground conductor substrate 70.

The third element antenna 2*c* is disposed along the third side 70*c* of the ground conductor substrate 70, and the first conductor 23 and the second conductor 33 in the third element antenna 2*c* are arranged on the same plane, that is, on the y-z plane.

The first conductor 23 in the third element antenna 2*c* is located close to the second side 70*b* of the ground conductor substrate 70 with respect to the second conductor 33 in the third element antenna 2*c*.

The fourth element antenna 2*d* has the feeding point 12*d* at a corner formed by the fourth side 70*d* and the first side 70*a* of the ground conductor substrate 70.

The fourth element antenna 2*d* is disposed along the fourth side 70*d* of the ground conductor substrate 70, and the first conductor 23 and the second conductor 33 in the fourth element antenna 2*d* are arranged on the same plane, that is, on the x-z plane.

The first conductor 23 in the fourth element antenna 2*d* is located close to the third side 70*c* of the ground conductor substrate 70 with respect to the second conductor 33 in the fourth element antenna 2*d*.

The antenna device according to the eighth embodiment has a similar effect to the antenna device according to the seventh embodiment.

Note that, in the antenna device according to the eighth embodiment, the spiral shape of the second conductor 33 in each of the element antennas 2*a* to 2*d* may be a circumferential shape as in the antenna device according to the second embodiment.

In addition, in the antenna device according to the eighth embodiment, the shape of the second portion 23*b* of the first conductor 23 in each of the element antennas 2*a* to 2*d* may be a meandering shape as in the antenna device according to the third embodiment.

Ninth Embodiment

An antenna device according to a ninth embodiment will be described with reference to FIG. 17.

The antenna device according to the ninth embodiment is different from the antenna device according to the seventh embodiment in that a second conductor 32 is disposed on a plane orthogonal to a plane where a first conductor 22 is disposed in the antenna device according to the ninth embodiment while the first conductor 22 and the second conductor 32 are arranged on the same plane in each of the plurality of element antennas 1*a* to 1*d* in the antenna device according to the seventh embodiment, and is the same as the antenna device according to the seventh embodiment in the other points.

Figure 17:
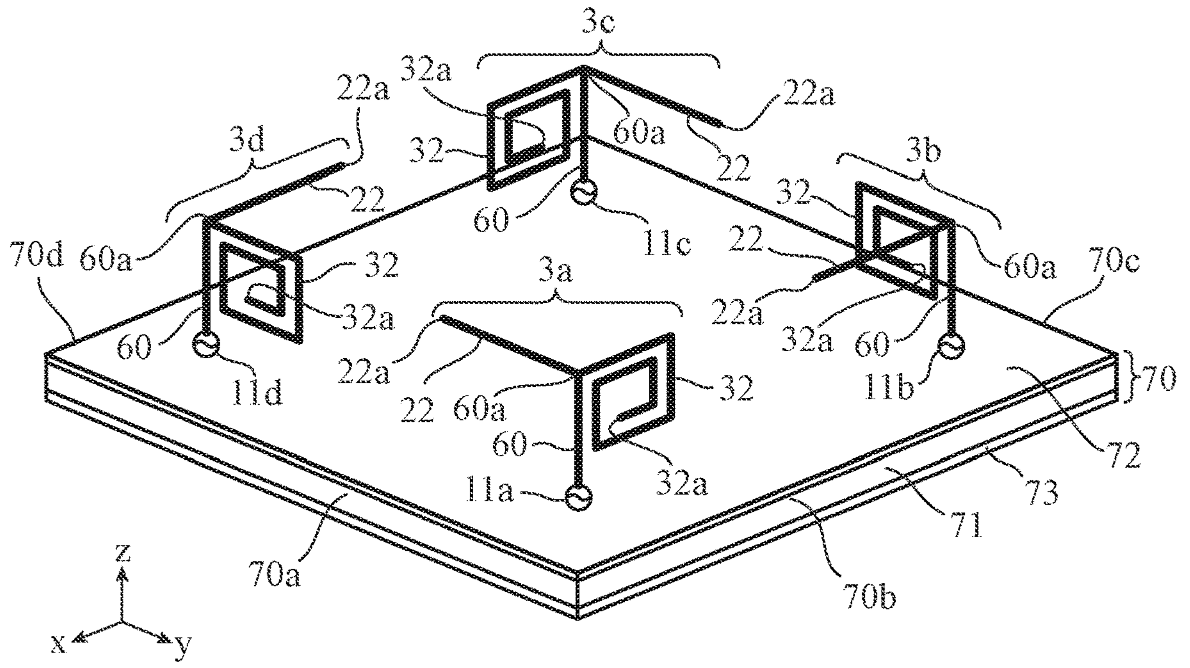
FIG. 17 is a perspective view illustrating an antenna device according to a ninth embodiment.

In FIG. 17, the same reference numerals as in FIG. 12 denote the same or corresponding portions.

The antenna device according to the ninth embodiment includes a ground conductor substrate 70, a plurality of element antennas 3*a* to 3*d*, a coaxial line 80, and an interface circuit 90.

The second conductor 32 in each of the plurality of element antennas 3*a* to 3*d* is bent at a right angle from the first conductor 22 at branch point 60*a*, and disposed on a plane orthogonal to a plane where the first conductor 22 is disposed. When the first conductor 22 is disposed on the y-z plane, the second conductor 32 is disposed on the x-z plane, and when the first conductor 22 is disposed on the x-z plane, the second conductor 32 is disposed on the y-z plane.

The first element antenna 3*a* has a feeding point 11*a* at a corner formed by a first side 70*a* and a second side 70*b* of the ground conductor substrate 70.

The first conductor 22 in the first element antenna 3*a* is disposed along the first side 70*a* of the ground conductor substrate 70 toward a fourth side 70*d*, and the second conductor 32 in the first element antenna 3*a* is disposed along the second side 70*b* of the ground conductor substrate 70 toward a third side 70*c*.

The first conductor 22 in the first element antenna 3*a* is disposed on the y-z plane, and the second conductor 32 in the first element antenna 3*a* is disposed on the x-z plane.

The second element antenna 3*b* has a feeding point 11*b* at a corner formed by the second side 70*b* and the third side 70*c* of the ground conductor substrate 70.

The first conductor 22 in the second element antenna 3*b* is disposed along the second side 70*b* of the ground conductor substrate 70 toward the first side 70*a*, and the second conductor 32 in the second element antenna 3*b* is disposed along the third side of the ground conductor substrate 70 toward the fourth side 70*d*.

The first conductor 22 in the second element antenna 3*b* is disposed on the x-z plane, and the second conductor 32 in the second element antenna 3*b* is disposed on the y-z plane.

The third element antenna 3*c* has a feeding point 11*c* at a corner formed by the third side 70*c* and the fourth side 70*d* of the ground conductor substrate 70.

The first conductor 22 in the third element antenna 3*c* is disposed along the third side 70*c* of the ground conductor substrate 70 toward the second side 70*b*, and the second conductor 32 in the third element antenna 3*c* is disposed along the fourth side of the ground conductor substrate 70 toward the first side 70*a*.

The first conductor 22 in the third element antenna 3*c* is disposed on the y-z plane, and the second conductor 32 in the third element antenna 3*c* is disposed on the x-z plane.

The fourth element antenna 3*d* has a feeding point 11*d* at a corner formed by the fourth side 70*d* and the first side 70*a* of the ground conductor substrate 70.

The first conductor 22 in the fourth element antenna 3*d* is disposed along the fourth side 70*d* of the ground conductor substrate 70 toward the third side 70*c*, and the second conductor 32 in the fourth element antenna 3*d* is disposed along the first side 70*a* of the ground conductor substrate 70 toward the second side 70*b*.

The first conductor 22 in the fourth element antenna 3*d* is disposed on the x-z plane, and the second conductor 32 in the fourth element antenna 3*d* is disposed on the y-z plane.

The antenna device according to the ninth embodiment has a similar effect to the antenna device according to the seventh embodiment.

Furthermore, in the antenna device according to the ninth embodiment, by flowing of a current through the first ground conductor 72 and the second ground conductor 73 of the ground conductor substrate 70, electromagnetic waves emitted from the first ground conductor 72 and the second ground conductor 73 are also combined with electromagnetic waves emitted from the first conductor 22 and the second conductor 32 in each of the first element antenna 3*a* to the fourth element antenna 3*d*, and therefore an influence of the electromagnetic waves emitted from the first ground conductor 72 and the second ground conductor 73 can also be suppressed.

Note that, in each of the first element antenna 3*a* to the fourth element antenna 3*d*, the orthogonality between the plane where the first conductor 22 is disposed and the plane where the second conductor 32 is disposed does not strictly mean only 90 degrees, and includes a plus/minus allowable range with respect to 90 degrees.

Note that, in the antenna device according to the ninth embodiment, the spiral shape of the second conductor 32 in each of the element antennas 3*a* to 3*d* may be a circumferential shape as in the antenna device according to the second embodiment.

In addition, in the antenna device according to the ninth embodiment, the shape of the first conductor 22 in each of the element antennas 3*a* to 3*d* may be a meandering shape as in the antenna device according to the third embodiment.

Tenth Embodiment

An antenna device according to a tenth embodiment will be described with reference to FIG. 18.

The antenna device according to the tenth embodiment is different from the antenna device according to the seventh embodiment in that the antenna device according to the tenth embodiment includes dielectric blocks 100*a* to 100*d* that correspond to the respective element antennas 1*a* to 1*d*, and that have surfaces on which element antennas 1*a* to 1*d* are respectively formed, and the antenna device according to the tenth embodiment is the same as the antenna device according to the seventh embodiment in remaining points.

Figure 18:
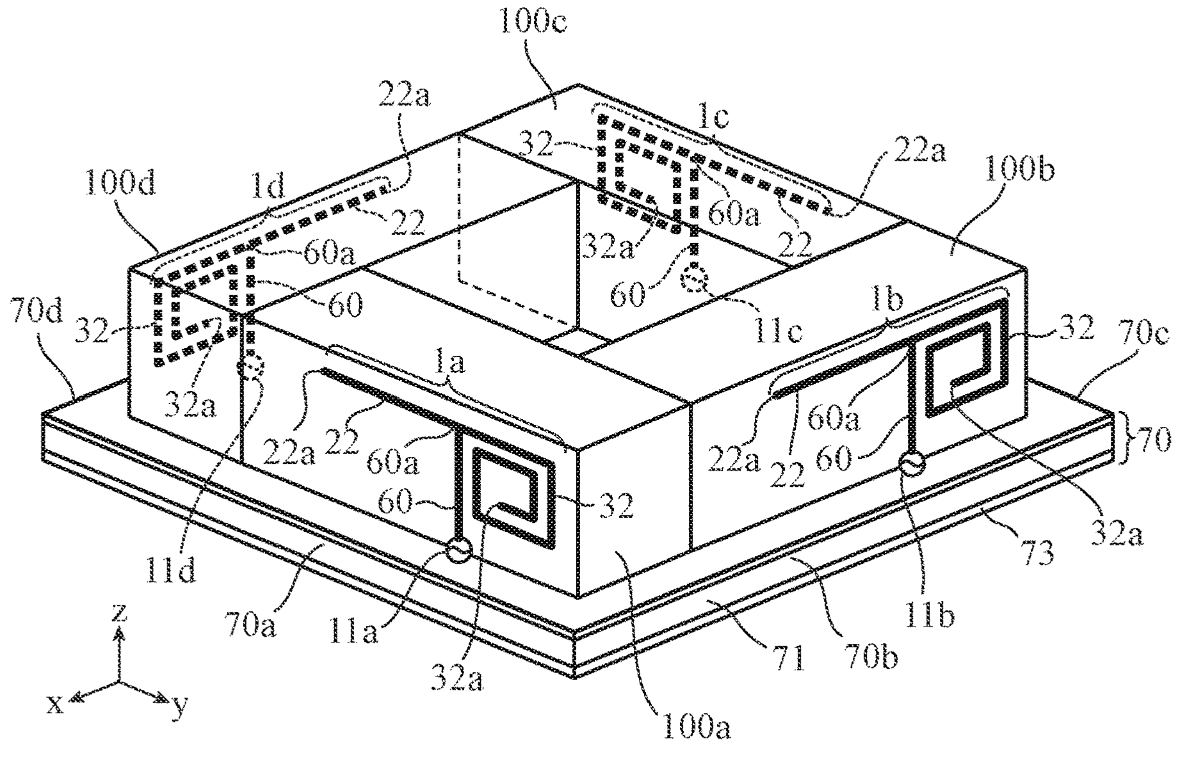
FIG. 18 is a perspective view illustrating an antenna device according to a tenth embodiment.

In FIG. 18, the same reference numerals as in FIG. 12 denote the same or corresponding portions.

The first dielectric block 100*a* to the fourth dielectric block 100*d* are arranged corresponding to the first element antenna 1*a* to the fourth element antenna 1*d*, respectively.

Each of the first dielectric block 100*a* to the fourth dielectric block 100*d* is a rectangular parallelepiped block made of resin.

The first dielectric block 100*a* is disposed on a surface of a first ground conductor 72 of a ground conductor substrate 70 along a first side 70*a* of the ground conductor substrate 70, and the first element antenna 1*a* is formed on an outer surface of the first dielectric block 100*a* parallel to the y-z plane.

The second dielectric block 100*b* is disposed on the surface of the first ground conductor 72 of the ground conductor substrate 70 along a second side 70*b* of the ground conductor substrate 70, and the second element antenna 1*b* is formed on an outer surface of the second dielectric block 100*b* parallel to the x-z plane.

The third dielectric block 100*c* is disposed on the surface of the first ground conductor 72 of the ground conductor substrate 70 along a third side 70*c* of the ground conductor substrate 70, and the third element antenna 1*c* is formed on an outer surface of the third dielectric block 100*c* parallel to the y-z plane.

The fourth dielectric block 100*d* is disposed on the surface of the first ground conductor 72 of the ground conductor substrate 70 along a fourth side 70*d* of the ground conductor substrate 70, and the fourth element antenna 1*d* is formed on an outer surface of the fourth dielectric block 100*d* parallel to the x-z plane.

The antenna device according to the tenth embodiment has a similar effect to the antenna device according to the seventh embodiment.

Furthermore, since the antenna device according to the tenth embodiment includes the first dielectric block 100*a* to the fourth dielectric block 100*d* corresponding to the first element antenna 1*a* to the fourth element antenna 1*d*, a wavelength shortening effect can be obtained, that is, in the element antennas 1*a* to 1*d*, the lengths of the first conductor 23 and the second conductor 33 for generating resonance with respect to a resonance frequency can be shortened, and therefore the antenna device according to the tenth embodiment can be further downsized as compared with the antenna device according to the seventh embodiment.

Figure 19:
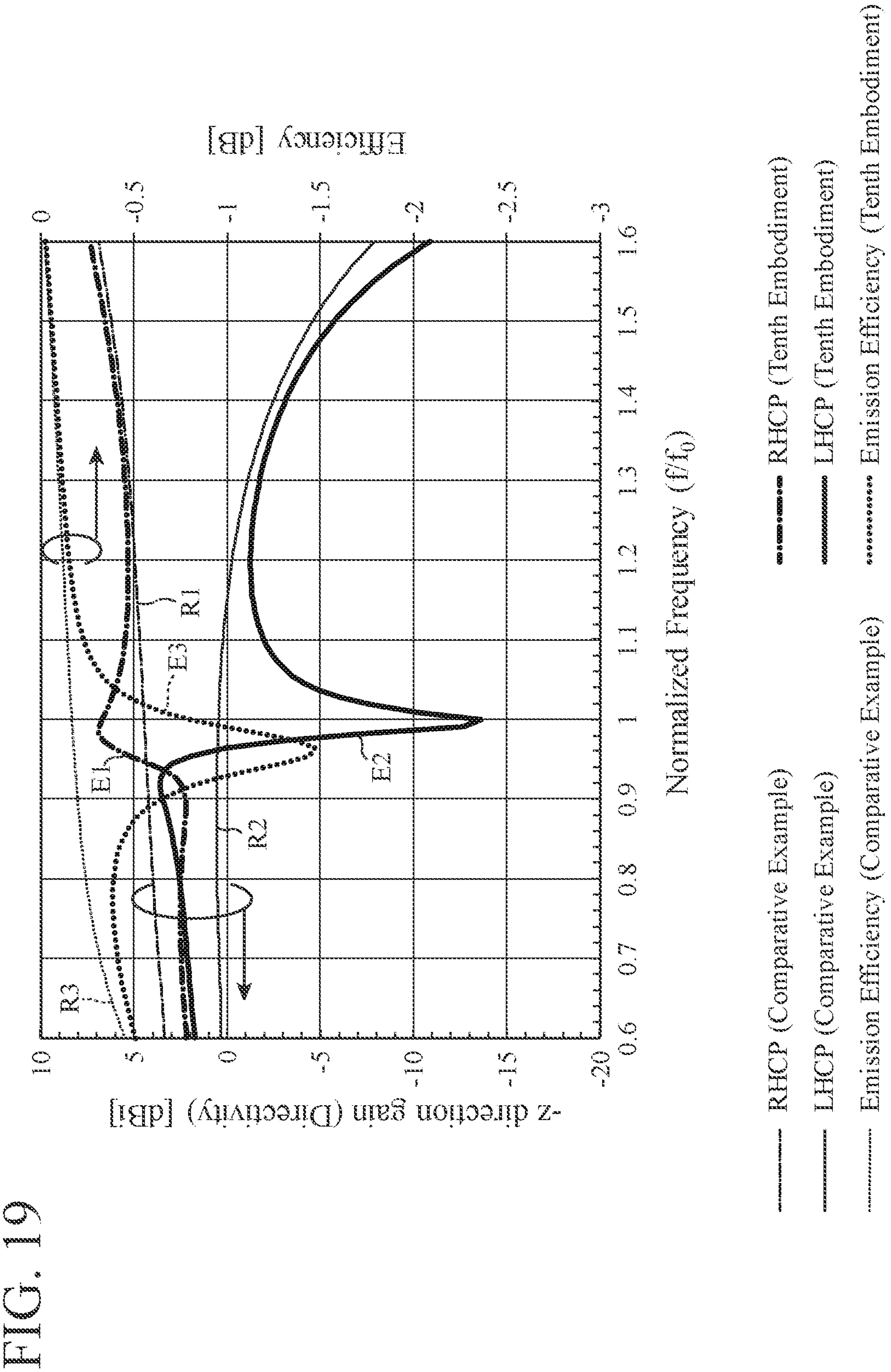
FIG. 19 is a diagram illustrating numerical analysis results of element antennas in the antenna device according to the tenth embodiment.

FIG. 19 illustrates an example of numerical analysis results of RHCP emitted in the positive direction of the z-axis, LHCP emitted in the negative direction of the z axis, and emission efficiency of each of the element antennas 1*a* to 1*d* formed on the surfaces of the dielectric blocks 100*a* to 100*d* in the antenna device according to the tenth embodiment.

In FIG. 19, the horizontal axis, the vertical axis, and the curves have the same meaning as those of FIG. 14, and the comparative example is the same as that used for the numerical analysis results of FIG. 14.

The dielectric blocks 100*a* to 100*d* each have a relative permittivity of 3.0 and a dielectric loss tangent of 0.002.

As is clear from FIG. 19, in each of the element antennas 1*a* to 1*d* in the antenna device according to the tenth embodiment, in a case where the entire length from the first open end 22*a* of the first conductor 22 to the second open end 32*a* of the second conductor 32 is ½ wavelength of a wavelength corresponding to a resonance frequency, that is, f/f0=1 is satisfied, the cross polarized wave (LHCP) E2 has a very low value with respect to the cross polarized wave (LHCP) R2 of the comparative example, and the main polarized wave (RHCP) E1 is higher than the main polarized wave (RHCP) R1 of the comparative example.

That is, each of the element antennas 1*a* to 1*d* includes the first conductor 22 extending linearly and the second conductor extending spirally, and the element antennas 1*a* to 1*d* include the dielectric blocks 100*a* to 100*d*, respectively. Therefore, a back lobe to be emitted to an antenna rear side can be suppressed in the element antennas 1*a* to 1*d*.

Note that, as illustrated in FIG. 19, by an influence of a dielectric loss due to a dielectric loss tangent (tan 6) based on the dielectric blocks 100*a* to 100*d*, the emission efficiency at a resonance frequency decreases to the vicinity of −1.5 dB when f/f0 is in other words, when the entire length from the first open end 22*a* of the first conductor 22 to the second open end 32*a* of the second conductor 32 is 0.48 wavelength of a wavelength corresponding to the resonance frequency, increases when the entire length is equal to or more than 0.48 wavelength, and is −1.0 dB or more when the entire length is equal to or more than ½ wavelength.

Therefore, in consideration of the emission efficiency at the resonance frequency, the entire length from the first open end 22*a* of the first conductor 22 to the second open end 32*a* of the second conductor 32 is equal to or more than 0.48 wavelength, and preferably within a range of ½ wavelength to one wavelength.

Note that, in the antenna device according to the tenth embodiment, the spiral shape of the second conductor 32 in each of the element antennas 1*a* to 1*d* may be a circumferential shape as in the antenna device according to the second embodiment.

In addition, in the antenna device according to the tenth embodiment, the shape of the first conductor 22 in each of the element antennas 1*a* to 1*d* may be a meandering shape as in the antenna device according to the third embodiment.

Furthermore, similarly to the dielectric blocks 100*a* to 100*d* on which the element antennas 1*a* to 1*d* in the antenna device according to the tenth embodiment are formed, the antenna device according to the first embodiment may include a dielectric block having a surface on which the first conductor 20 and the second conductor 30 are formed, the antenna device according to the fifth embodiment may include a dielectric block having a surface on which the first conductor 22, the second conductor 32, and the third conductor 60 are formed, and the antenna device according to the sixth embodiment may include a dielectric block having a surface on which the first conductor 22 and the second conductor 32 are formed. These embodiments also have similar effects to the antenna device according to the tenth embodiment.

Note that the embodiments can be freely combined to each other, any constituent element in each of the embodiments can be modified, or any constituent element in each of the embodiments can be omitted.

INDUSTRIAL APPLICABILITY

The antenna device according to the present disclosure is suitable for an antenna device used for a terminal or the like that receives a polarized wave transmitted from a satellite phone service or a global positioning system satellite.

REFERENCE SIGNS LIST

10, 11, 11*a* to 11*d*, 12, 12*a* to 12*d*: Feeding point, 20, 21 to 23: First conductor, 30, 31 to 33: Second conductor, 40: Balance-unbalance converter, 50: Coaxial line, 60: Third conductor, 60*a*: Branch point, 1*a* to 1*d*, 2*a* to 2*d*: Element antenna, 70: Ground conductor substrate, 71: Dielectric substrate, 72: First ground conductor, 73: Second ground conductor, 80: Coaxial line, 90: Interface circuit, 100*a* to 100*d*: Dielectric block

The invention claimed is:

1. An antenna device comprising:

a ground conductor substrate including a dielectric substrate, a first ground conductor disposed on a front surface of the dielectric substrate, and a second ground conductor disposed on a back surface of the dielectric substrate in parallel with the first ground conductor;

a plurality of element antennas arranged on a surface of the first ground conductor;

a coaxial line penetrating the dielectric substrate and having an outer conductor to electrically connect the first ground conductor and the second ground conductor to each other; and an interface circuit to function as at least either:

- a combining circuit to connect the plurality of element antennas to the coaxial line, to turn high-frequency signals different in phase from each other, output from the plurality of element antennas into phase-aligned high-frequency signals, to combine the phase-aligned high-frequency signals, and to output a combined high-frequency signal to the coaxial line; or
- a dividing circuit to divide a high-frequency signal transmitted by the coaxial line into a plurality of signals different in phase from each other, and to output the divided high-frequency signals to the respective plurality of element antennas, wherein each of the plurality of element antennas includes:

a third conductor having a first end connected to the first ground conductor and extending linearly from the first ground conductor to a branch point in a zenith direction;

a first conductor having a first end serving as a first open end and extending from the branch point to the first open end in a horizontal direction orthogonal to the zenith direction; and a second conductor having a first end serving as a second open end and extending spirally between the branch point and the second open end in a direction different from a direction directed from the branch point to the first open end and further comprising a plurality of dielectric blocks corresponding to the respective plurality of element antennas and arranged on a surface of the first ground conductor in the ground conductor substrate, wherein each of the plurality of dielectric blocks has a surface on which the first conductor, the second conductor, and the third conductor of each of the plurality of corresponding element antennas are formed.

2. The antenna device according to claim 1, wherein in each of the plurality of element antennas, an entire length from the first open end of the first conductor to the second open end of the second conductor is within a range of 0.48 wavelength to 0.8 wavelength of a wavelength corresponding to a resonance frequency.

3. An antenna device comprising:

a ground conductor substrate including a dielectric substrate, a first ground conductor disposed on a front surface of the dielectric substrate, and a second ground conductor disposed on a back surface of the dielectric substrate in parallel with the first ground conductor;

a plurality of element antennas arranged on a surface of the first ground conductor;

a coaxial line penetrating the dielectric substrate and having an outer conductor to electrically connect the first ground conductor and the second ground conductor to each other; and an interface circuit to function as at least either:

a combining circuit to connect the plurality of element antennas to the coaxial line, to combine high-frequency signals having different in phase from each other, output from the plurality of element antennas, and to output a combined high-frequency signal to the coaxial line; or a dividing circuit to divide a high-frequency signal transmitted by the coaxial line into a plurality of signals different in phase from each other, and to output divided high-frequency signals to the respective plurality of element antennas, wherein each of the plurality of element antennas includes:

a first conductor having a first end serving as a first open end, having a second end connected to the first ground conductor, having a connection point with the first ground conductor as a feeding point to excite a high-frequency signal, and having a first portion and a second portion, the first portion extending from the first ground conductor in a zenith direction, and the second portion extending continuously from the first portion to the first open end in a horizontal direction orthogonal to the zenith direction; and a second conductor having a first end serving as a second open end and having a third portion and a fourth portion, the third portion facing the first portion of the first conductor, and the fourth portion spirally extending continuously from the third portion to the second open end in a direction different from a direction in which the second portion of the first conductor goes toward the first open end and further comprising a plurality of dielectric blocks corresponding to the respective plurality of element antennas and arranged on a surface of the first ground conductor in the ground conductor substrate, wherein each of the plurality of dielectric blocks has a surface on which the first conductor, the second conductor, and the third conductor of each of the plurality of corresponding element antennas are formed.

4. The antenna device according to claim 3, wherein in each of the plurality of element antennas, an entire length of the first conductor is ¼ wavelength of a wavelength corresponding to a resonance frequency.

5. The antenna device according to claim 3, wherein in each of the plurality of element antennas, the first conductor and the second conductor are arranged on the same plane.

6. The antenna device according to claim 3, wherein in each of the plurality of element antennas, the second conductor is disposed on a plane orthogonal to a plane where the first conductor is disposed.

7. The antenna device according to claim 3, wherein in each of the plurality of element antennas, the spiral shape of the second conductor is a rectangular shape.

8. The antenna device according to claim 3, wherein in each of the plurality of element antennas, the spiral shape of the second conductor is a circumferential shape.

* * * * *